US011209566B2

(12) United States Patent
Zheng

(10) Patent No.: US 11,209,566 B2
(45) Date of Patent: Dec. 28, 2021

(54) NONLINEAR SIGNAL COMPARISON AND HIGH-RESOLUTION MEASUREMENT OF SEISMIC OR ACOUSTIC WAVE DISPERSION

(71) Applicant: University of Houston System, Houston, TX (US)

(72) Inventor: Yingcai Zheng, Houston, TX (US)

(73) Assignee: UNIVERSITY OF HOUSTON SYSTEM, Houston, TX (US)

(*) Notice: Subject to any disclaimer, the term of this patent is extended or adjusted under 35 U.S.C. 154(b) by 437 days.

(21) Appl. No.: 16/310,934

(22) PCT Filed: Jun. 20, 2017

(86) PCT No.: PCT/US2017/038325
§ 371 (c)(1),
(2) Date: Dec. 18, 2018

(87) PCT Pub. No.: WO2017/233079
PCT Pub. Date: Dec. 28, 2017

(65) Prior Publication Data
US 2020/0124757 A1   Apr. 23, 2020

Related U.S. Application Data

(60) Provisional application No. 62/353,122, filed on Jun. 22, 2016.

(51) Int. Cl.
*G01V 1/50* (2006.01)
*G01V 1/30* (2006.01)
*G01V 99/00* (2009.01)

(52) U.S. Cl.
CPC .............. *G01V 1/50* (2013.01); *G01V 1/30* (2013.01); *G01V 99/005* (2013.01); *G01V 2210/614* (2013.01); *G01V 2210/616* (2013.01)

(58) Field of Classification Search
USPC ........................................ 73/152.02; 703/2
See application file for complete search history.

(56) References Cited

U.S. PATENT DOCUMENTS 6,766,252 B2   7/2004  Blanch et al.
7,852,380 B2  12/2010  Wang et al.
(Continued)

FOREIGN PATENT DOCUMENTS

CA    1222320      5/1987
CN  104678435      6/2015
(Continued)

OTHER PUBLICATIONS

Notification of Transmittal of the International Preliminary Report on Patentability for PCT/US2017/038325 dated Jan. 3, 2019 from the International Bureau of WIPO, containing the Written Opinion of the International Searching Authority—Republic of Korea, dated Sep. 11, 2017, 6 pages.

*Primary Examiner* — Paul D Lee
(74) *Attorney, Agent, or Firm* — Jackson Walker LLP

(57) ABSTRACT

The present disclosure relates generally to signal comparison in seismic/acoustic imaging and data processing. In particular, this disclosure relates to a new nonlinear signal comparison (NLSC) approach which obtains a uniform resolution across a frequency band. The overall resolution in NLSC can be controlled over the frequency band by an adjustable parameter.

6 Claims, 24 Drawing Sheets

(56) References Cited

U.S. PATENT DOCUMENTS

| | | |
|---|---|---|
| 8,553,497 B2 | 10/2013 | Krohn |
| 8,611,839 B2 | 12/2013 | Principe et al. |
| 2006/0133470 A1 | 6/2006 | Raz et al. |
| 2009/0067286 A1 | 3/2009 | Bose et al. |
| 2010/0085835 A1* | 4/2010 | Tang ................. G01V 1/30 367/32 |
| 2011/0120724 A1 | 5/2011 | Krohn |
| 2011/0255371 A1 | 10/2011 | Jing et al. |
| 2012/0143510 A1* | 6/2012 | Alam ................. G01V 1/34 702/16 |
| 2012/0201096 A1 | 8/2012 | Valero et al. |
| 2012/0330554 A1 | 12/2012 | Ross et al. |
| 2013/0058381 A1 | 3/2013 | Chen et al. |
| 2015/0218930 A1 | 8/2015 | Zeroug et al. |

FOREIGN PATENT DOCUMENTS

| | | |
|---|---|---|
| WO | 2008/037964 | 4/2008 |
| WO | 2013190513 | 12/2013 |

\* cited by examiner

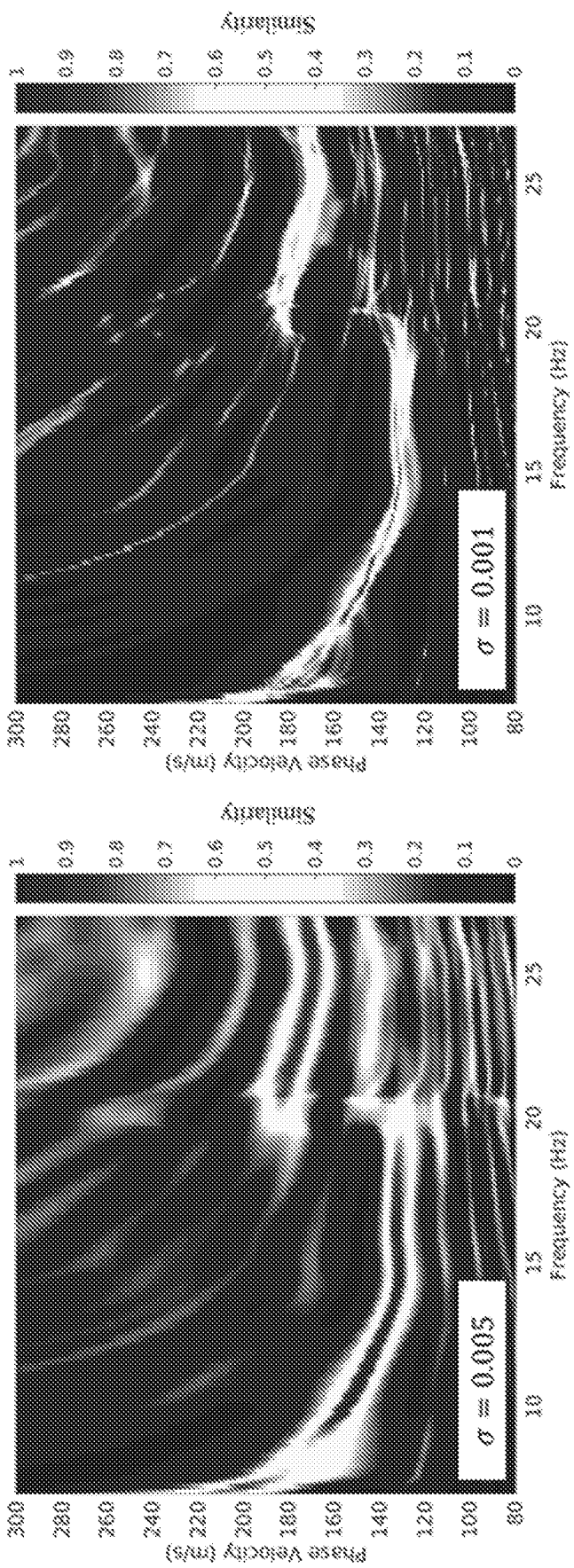

NONLINEAR SIGNAL COMPARISON AND HIGH-RESOLUTION MEASUREMENT OF SEISMIC OR ACOUSTIC WAVE DISPERSION

This application claims priority to U.S. Provisional Patent Application Ser. No. 62/353,122, entitled "Nonlinear Signal Comparison and High-Resolution Measurement of Seismic or Acoustic Wave Dispersion," filed Jun. 22, 2016, the entire content of which is hereby incorporated by reference.

BACKGROUND

This disclosure pertains to signal comparison in seismic imaging and data processing.

Most seismic data analyses and processing, such as seismic waveform inversion, seismic imaging and migration, surface wave analysis, involve some form of signal comparison. For example, in seismic waveform inversion synthetic seismic traces need to be compared with the observed seismic traces. In seismic migration and seismic imaging the forwarded propagated and backward propagated wavefield need to be compared at the image point. In surface wave (or body wave) analyses, recorded signals of similar waveforms from two receivers need to be compared and their relative time shift due to propagation determined. Such a comparison is usually done by crosscorrelation in the framework of the Fourier analysis and the least squares minimization. Traditional crosscorrelation is referred to as linear signal comparison (LSC).

However, it is known that the capability of crosscorrelation of resolving a small time shift between two signals depends on the frequency of the signal as well, with poor resolving power at the low frequencies. This is, in particular, true for measuring the low-frequency wave dispersion. In fact, the crosscorrelation is just one of the techniques to compare signals and it is not necessary to use only crosscorrelation for accomplishing this task.

Many types of seismic waves show dispersion, which is a phenomenon where waves of different frequencies travel at different velocities. Seismic surface waves are energetic waves excited by shallow natural or induced earthquakes or man-made sources and they propagate along the surface of the Earth and in general their amplitudes decay with increasing depth but this is frequency dependent. Surface wave propagation velocities are sensitive to shallow shear-wave velocity structures and surface-wave inversion is a powerful tool to interrogate subsurface structures and has been extensively used in both global seismology and exploration seismology. For borehole acoustic logging, the dispersion measurement for the Stoneley wave is critical to infer geological formation properties around the borehole. In the inversion of dispersion data, the first step is to estimate the frequency-dependent phase-velocity from the seismic data. In all these cases, the precise determination of the propagation velocity as a function of frequency is critical to infer medium properties. In global earthquake seismology, when station distribution in the world was sparse, the one-station method was used to measure the globally averaged dispersion using globally propagating Love waves (G waves). More recently, it was proposed to use the same single-station method with the global Rayleigh wave (R waves) group velocity dispersion to infer seismic velocity structure and internal temperature profile for other planets such as Mars. To achieve this goal, it requires high-resolution dispersion measurement for future Mars seismic data. A more widely used method is the two-station method in both global and exploration seismology to generate phase and group velocity spatial maps however this method also suffers the low-resolution problem. When the spatial distribution of the receivers is dense, multichannel surface wave analysis using slant stacking can be used to obtain dispersion and multi-offset phase analysis. Recognizing the resolution issue, effort had been made to sharpen the resolution using a high resolution Radon transform, a mode matching, or some arithmetic power operation of dispersion map. However, these optimizations of the resolution are not beyond the scope of the linear signal analysis and can only achieve limited success.

SUMMARY

The present disclosure relates broadly to signal comparison in seismic imaging and data processing. In particular, this disclosure relates to a new nonlinear signal comparison (NLSC) approach which can obtain a uniform resolution across a wide frequency band. The overall resolution in NLSC can be controlled over the frequency band by an adjustable parameter. The traditional crosscorrelation is a special case corresponding to one particular value of the parameter. The effectiveness of NLSC has been demonstrated by extracting surface Rayleigh wave dispersion curves from 5 different datasets, including a synthetic fundamental-mode Rayleigh wave data, synthetic overtone Rayleigh waves, synthetic global Rayleigh waves of a Martian seismic model which is useful for the future Martian seismological mission, an exploration-type seismic gather generated by a dynamite source, and a real ambient noise correlation data processed from the USArray. Over a wide range of frequencies, the NLSC method can achieve high-fidelity high-resolution extraction of the dispersion curve in particular at the low frequency end.

For surface wave dispersion, it is expected that the measured low-frequency dispersion is more reliable as the low frequency waves are less affected by scattering. However, the broad lobes (low resolution) at low frequencies generated by the crosscorrelation are often interpreted as large errors and low confidence and this interpretation is clearly problematic. It is instead an issue in the measurement method. In the present NLSC approach, a uniform resolution is achieved for all frequencies and the overall resolving capability is controlled by a continuous parameter $\sigma$ from 0 to $\infty$. When $\sigma=\infty$, the NLSC reduces to familiar crosscorrelation but when $\sigma=0$, the smeared dispersion shrinks to a geometric line which is the dispersion curve (a geometric curve with zero thickness).

The performance of the NLSC is applicable in many different datasets, ranging from synthetic data to field data, from global seismology to exploration, and even to planetary settings.

BRIEF DESCRIPTION OF THE DRAWINGS

FIG. 11B-11D show dispersion maps using the field seismic data of FIG. 10A by NLSC with $\sigma$ being 0.01, 0.005 and 0.001, respectively.

DETAILED DESCRIPTION OF PREFERRED EMBODIMENTS

The present disclosure relates to a nonlinear signal comparison for use in seismic imaging and data processing.

In preferred embodiments, the present disclosure pertains to a method for comparing seismic and acoustic signals for dispersion analyses and seismic imaging and inversion. Preferred embodiments include assigning a first time series waveform $d_1(t)$ for a wave propagating through a material at a first receiver and assigning a second time series waveform $d_x(t)$ for the wave at a second receiver located at a distance x from the first receiver, where the time series waveforms can be pressure, particle displacement, or velocity. In practice, many receivers can be used and signal comparison among the receivers can be made. Depending on the settings, the receivers can be on land, in the ocean, on the seafloor, or installed in the borehole.

For illustration, a traditional crosscorrelation-based measurement is described. A surface wave is considered that is excited by a source that propagates to the receiver 1 and then to the receiver x, in the same azimuth. Receiver 1 records a seismogram d1(t) and Receiver x records $d_x(t)$. The distance between these two receivers is given and if the relative time delay between the two signals can be measured, the phase velocity $V_{ph}$ can be obtained, defined as the distance divided by the time delay. Often both the time delay and the phase velocity are frequency $\omega$ dependent. In the traditional method, a range of $V_{ph}$ is searched and based on the resultant time delay, $x/V_{ph}(\omega)$, the trace $d_x(t)$ is shifted accordingly and the crosscorrelation is calculated:

$$S_{LSC}(\omega, V_{ph}) = \frac{1}{\sigma_1 \sigma_x} \int_0^T d_1(t; \omega) d_x\left[t + \frac{x}{V_{ph}(\omega)}; \omega\right] dt, \quad (1)$$

where $S_{LSC}(\omega, V_{ph})$ is the correlation for the frequency $\omega$ and the phase-velocity $V_{ph}(\omega)$; $d_1(t;\omega)$ and $d_x(t;\omega)$ are the seismic waveforms at the frequency $\omega$ in the time t domain; $d_x(t+xV_{ph}^{-1};\omega)$ is the time shifted trace according to the distance x between receiver x and the reference trace at receiver 1 (x=0) and the scanning phase-velocity $V^{ph}$; T is the length of the time window of interest; $\sigma_1$ and $\sigma_2$ are the variance of the signals defined as:

$$\sigma_1^2 = \int_0^T d_1^2(t; \omega) dt, \sigma_x^2 = \int_0^T d_x^2\left(t + \frac{x}{V_{ph}}; \omega\right) dt. \quad (2)$$

It is expected that at the true time shift if the scanned $V_{ph}$ is the true phase velocity, the two signals should achieve the maximum crosscorrelation $S_{LSC}(\omega, V_{ph})$. To see more clearly how S changes with the frequency $\omega$ and time delay $\tau$, two cosine signals over one period are considered and S is calculated:

$$S_{LSC}(\omega, \tau) = \int_0^{2\pi/\omega} \cos(\omega t)_{cos} [\omega(t-\tau)] dt \quad (3)$$

Figure 1A:
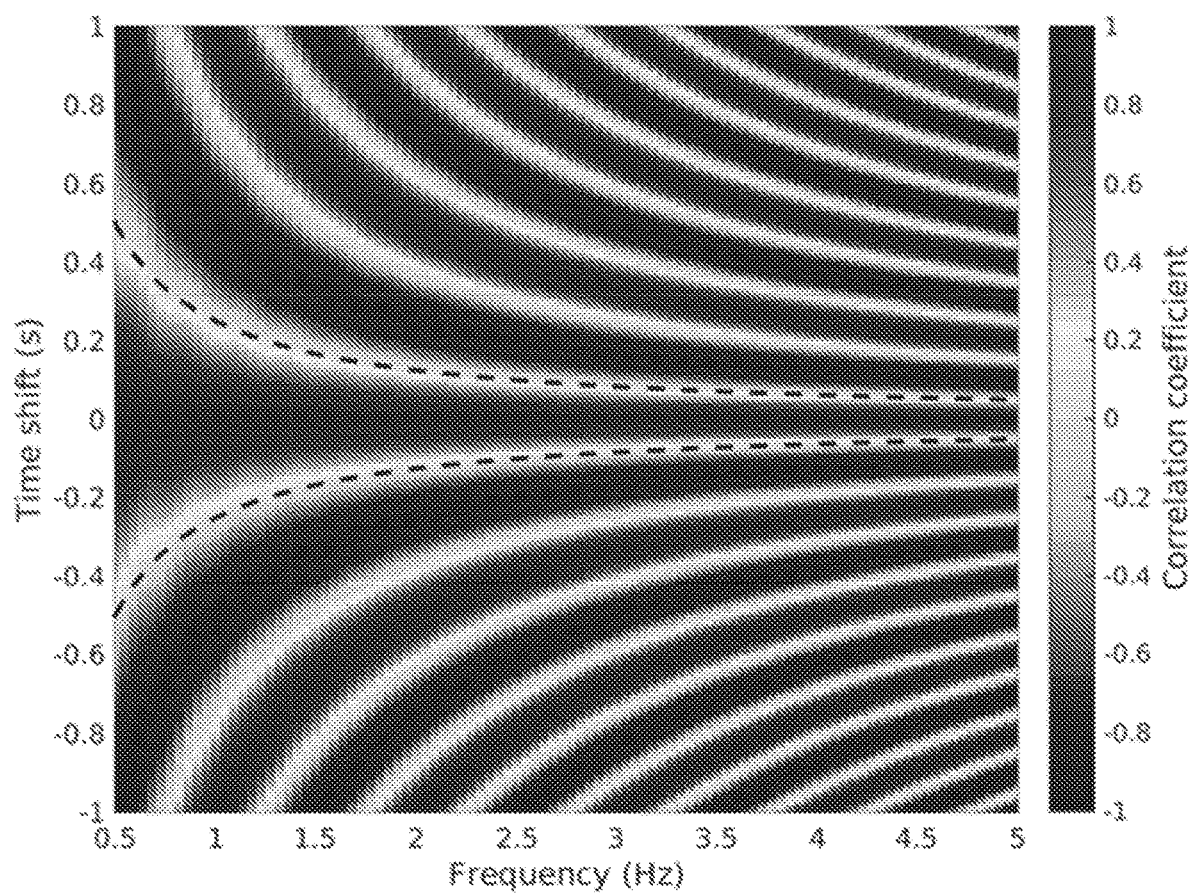
FIG. 1A shows linear correlation analysis $S_{LSC}$ for different time shifts based on equation (1) below at different frequencies.

In general, for low frequencies, $S_{LSC}(\omega, \tau)$ is insensitive to $\tau$ (FIG. 1A). This means that to use $S_{LSC}(\omega, \tau)$ to resolve the small time shift at low frequencies is not appropriate. On the other hand, the resolving power of $S_{LSC}(\omega, \tau)$ is non-uniform across different frequencies. In FIG. 1, two identical monochromatic signals of equal length in time T=2 s are used. FIG. 1A shows linear correlation analysis $S_{LSC}$ for different time shifts based on equation (1) at different frequencies.

The present new NLSC similarity measurement below overcomes the resolution limitation and achieves a uniform resolution across a wide band of frequencies:

$$S_{NL}(\omega, V_{ph}) = \frac{1}{T} \int_0^T \exp\left(-\frac{\left[\bar{d}_1(t; \omega) - \bar{d}_x\left(t + \frac{x}{V_{ph}}; \omega\right)\right]^2}{4\omega^2 \pi^{-2} \sigma^2}\right) dt \quad (4)$$

where the bar means variance-normalized traces filtered around frequency $\omega$:

$$\bar{d}_1(t; \omega) = \sigma_1^{-1} d_1(t; \omega), \bar{d}_x\left(t + \frac{x}{V_{ph}}; \omega\right) = \sigma_x^{-1} d_x\left(t + \frac{x}{V_{ph}}; \omega\right). \quad (5)$$

In the NLSC measure (4), σ is an overall continuous nonnegative parameter to control the overall resolution, and $\sigma_1$ and $\sigma_x$ represent variance of the data or other energy-related measure of the data, such as those related to the mean absolute value of the trace, mean square of the trace, sum of the absolute values of the trace, or sum of the square of the trace. A background value $S_\pi$ or $S_{NL}$ is defined when the two signals have a phase difference of π:

$$S_\pi = I_0(b)e^{-b} \quad (6)$$

where $I_0$ is the modified Bessel function of zero-th order and $$b = \frac{\pi^2}{\sigma^2 \omega^2 T}. \quad (7)$$

Finally, the normalized NLSC is defined as:

$$S_{NLSC}(\omega, V_{ph}; \sigma) = \frac{S_{NL}(\omega, V_{ph}) - S_\pi}{1 - S_\pi}. \quad (8)$$

Figure 1B:
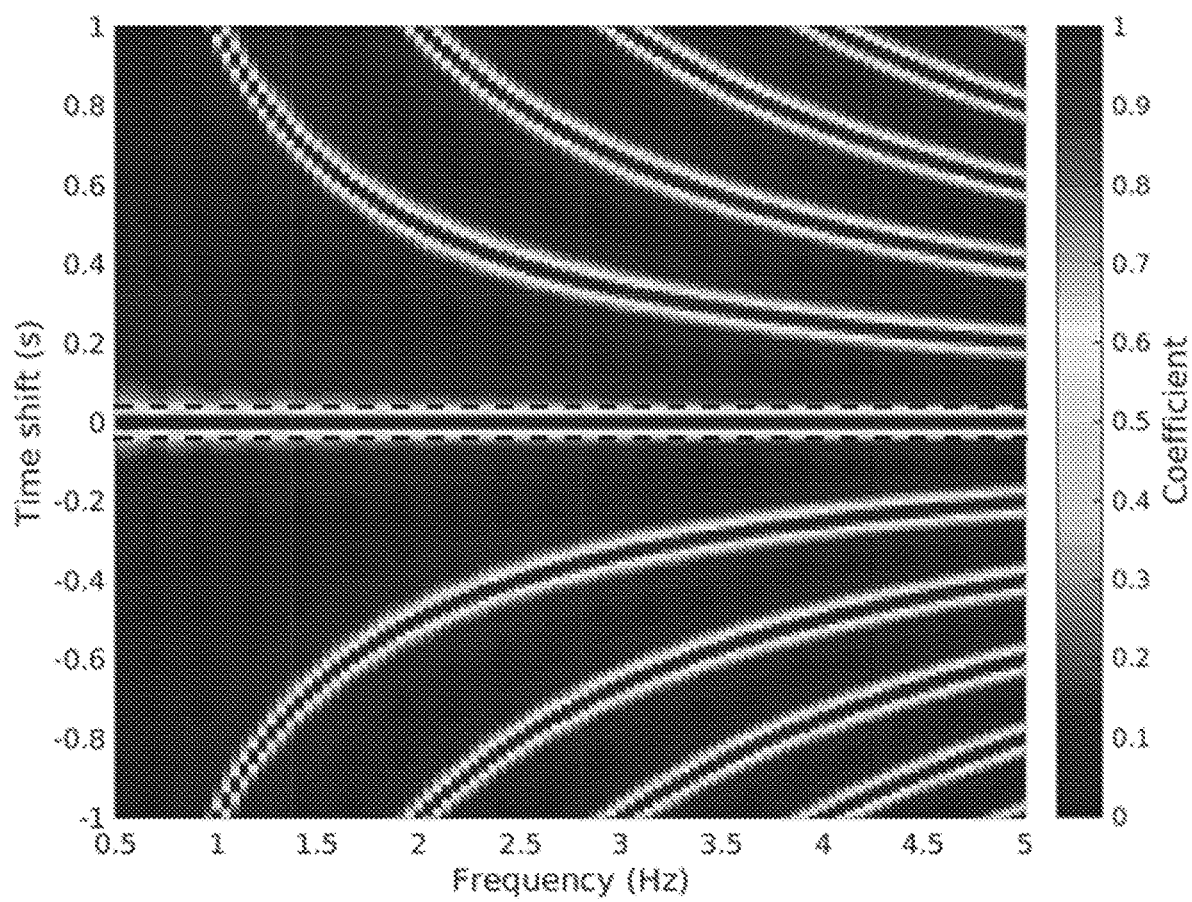
FIG. 1B shows non-linear correlation analysis $S_{NLSC}$ based on equation (8) below with $\sigma=0.04$.

The $S^{NLSC}$ range is from 0 to 1, but it can be scaled to any other interval. Equation (8) is an important equation and is also used in the examples below. $S^{NLSC}$ has uniform resolving power over a wide band of frequencies and the overall resolution is controlled by σ. If σ→∞, $S_{NLSC}→S_{LSC}$. $S_{NLSC}$ measures sensitivity to time shift and hence velocity and provides signal comparison information between receivers. For the same cosine signals considered in the last section, $S_{NLSC}$ achieves a uniform resolution over a wide band of frequencies (FIG. 1B). FIG. 1B shows $S_{NLSC}$ based on equation (8) with σ=0.04. At the zero time shifts, maximum values for both LSC and NLSC were achieved at all frequencies. Other bands (or stripes) are from the cycle skipping effect due to 2π-periodicity of the signals. The vertical width between the dash lines was considered as the resolving ability. Below, the performance of $S_{NLSC}$ is shown using both synthetic and field data examples.

In traditional linear signal analysis, the crosscorrelation is an underlying mathematical operation for surface wave dispersion measurement and many other signal comparisons. The crosscorrelation is sensitive to the time shift between two high-frequency seismograms but it is insensitive for low frequency data, resulting a broad lobe in the dispersion measurement from which the dispersion curve is usually extracted. The increasing broadening of the lobe from the high frequency to the low frequency is often interpreted as error in the surface wave dispersion measurement. This is apparently incorrect in that the low frequency surface dispersion measurement should be more robust (smaller error bars) because the low frequency wave is less likely to be contaminated by scattering due to small-scale heterogeneities, compared to a high frequency wave. The broadening merely reflects the sensitivity of the signal comparison technique in the framework of the linear signal comparison (LSC). However, having a broad side lobe does affect picking the dispersion curve. The large error-bars at the low frequency end simply mean a lack of confidence in velocity picking.

The present nonlinear signal comparison (NLSC) scheme can achieve a uniform sensitivity across a wide band of frequencies. An adjustable parameter (σ) in the NLSC, ranging from zero to infinity, controls the overall sensitivity. When the parameter approaches to infinity, the NLSC reduces to the traditional crosscorrelation. On the other hand, when the parameter approaches to zero, an infinite sensitivity can be achieved. While any value can be selected, a preferred range for this parameter is 0.001 to 10, depending on the desired amount of sensitivity. This sensitivity directly translates to resolution. The proposed NLSC has a wide range of applications where a signal comparison is needed. For example, if it were used in seismic imaging/migration, the user would need to compare (traditionally crosscorrelate), at the imaging target location, the wavefield from the source and the back-propagated wavefield from the receivers. The present high-resolution technique directly translates to the spatial resolution of the imaging algorithm. In this embodiment, the waveforms from the two receivers can be viewed as the downgoing forward propagated wavefield and the backward extrapolated receiver wavefield, respectively. In seismic waveform inversion, the waveforms from the two receivers are the modeled and the actually recorded wavefield, respectively. Uniform imaging resolution can be achieved using NLSC for seismic data of different frequencies.

The effectiveness and performance of the NLSC using a number of synthetic and field data examples have been demonstrated, in the context of global seismology, exploration seismology, and planetary seismology for future Martian seismological mission. The method is applicable in analyzing surface waves as well as in borehole acoustic logging.

EXAMPLE 1

Fundamental-Mode Rayleigh Wave with Two-Layer Model

Figure 2A:
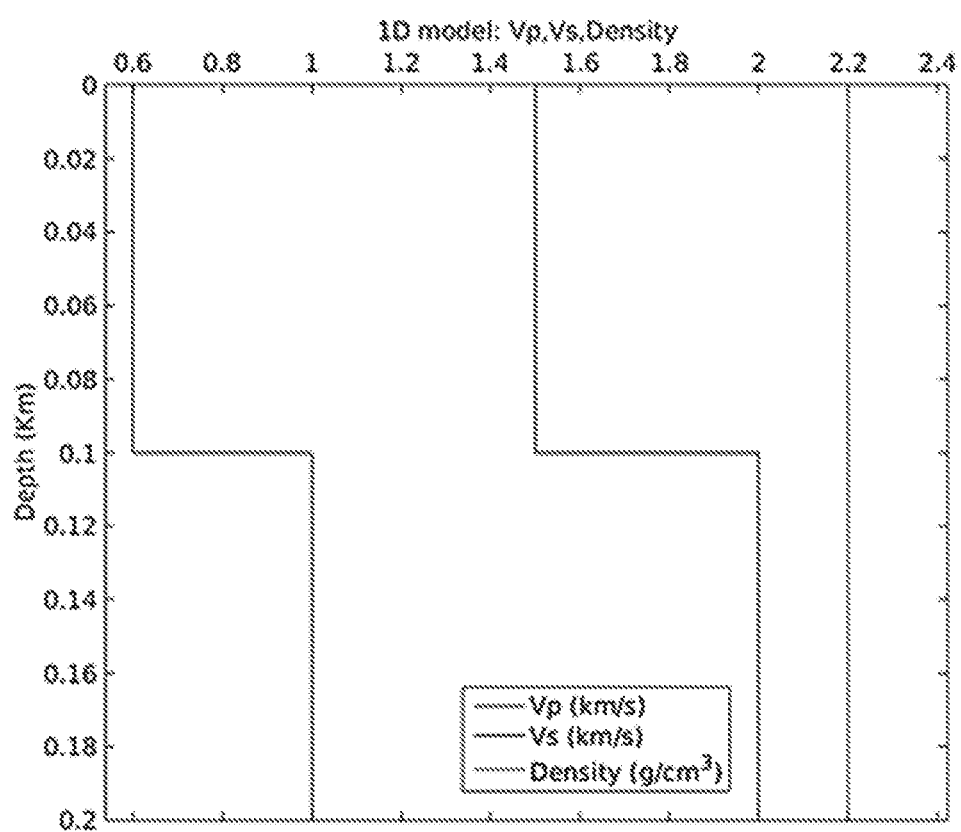
FIG. 2A shows a two-layered model with P-wave (Vp) in the center, S-wave (Vs) velocities on the left and the density on the right.
Figure 2B:
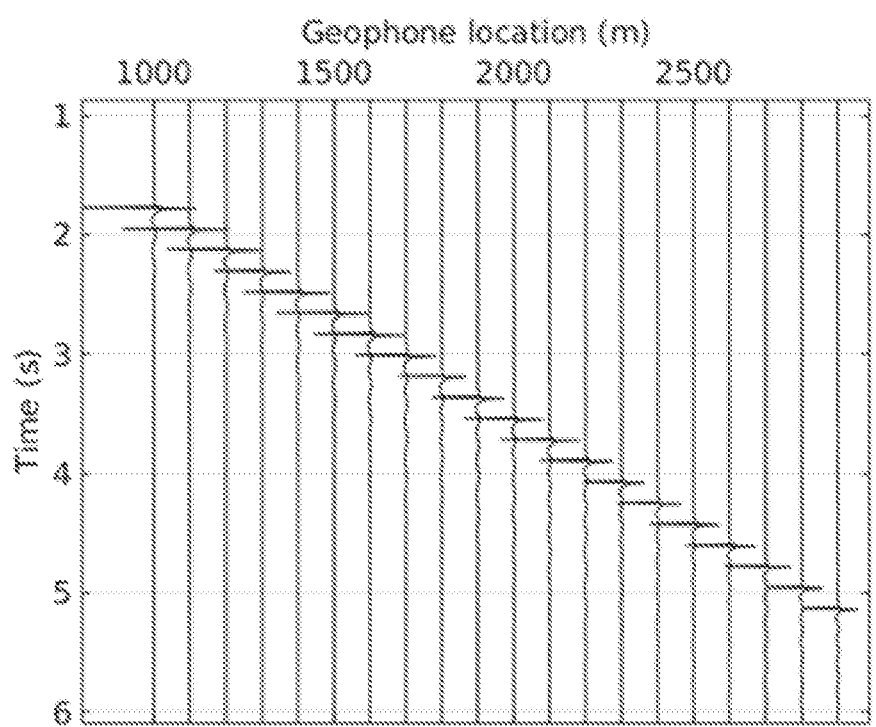
FIG. 2B shows vertical-component of the fundamental-mode surface Rayleigh wave.
Figure 3A:
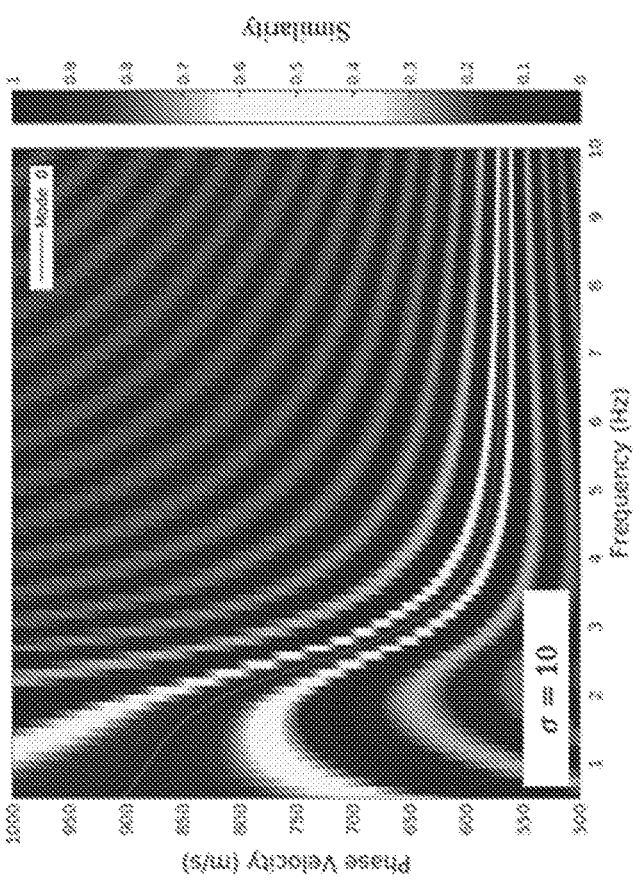
FIG. 3A shows a dispersion map for $S_{LSC}$.
Figure 3B:
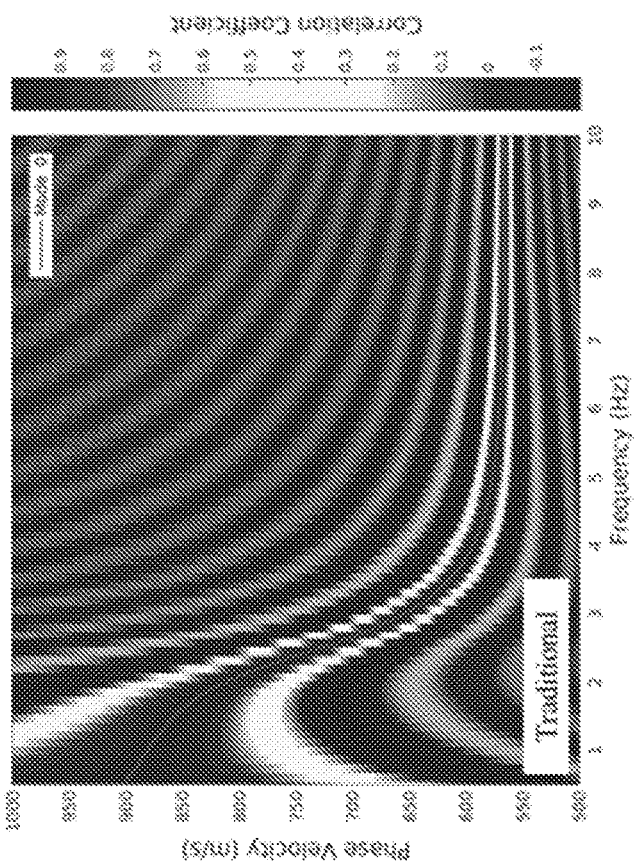
FIG. 3B-3F show dispersion maps for $S_{NLSC}(\omega, V_{ph}; \sigma)$ at $\sigma$=10, 0.05, 0.01, 0.005 and 0.001, respectively.
Figure 3D:
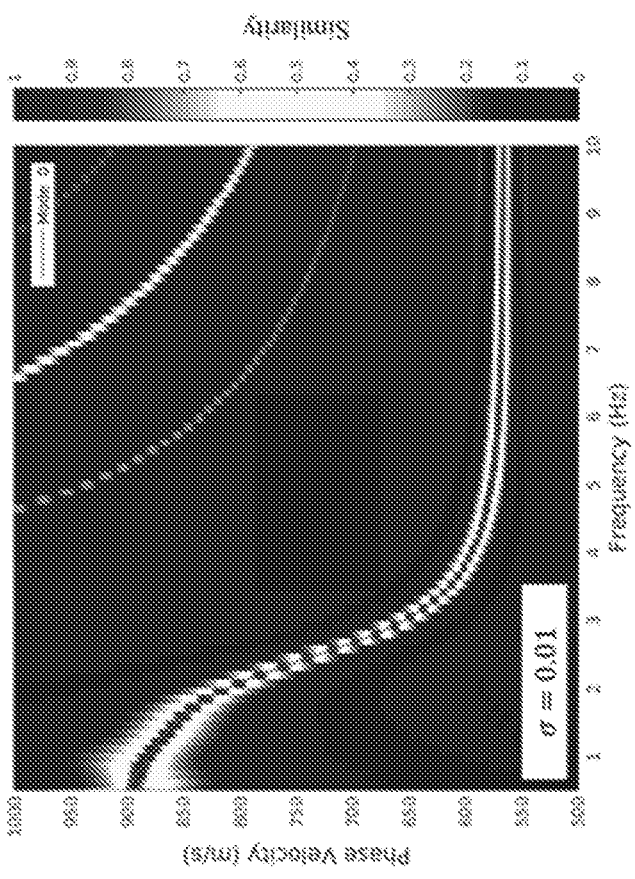
Figure 3C:
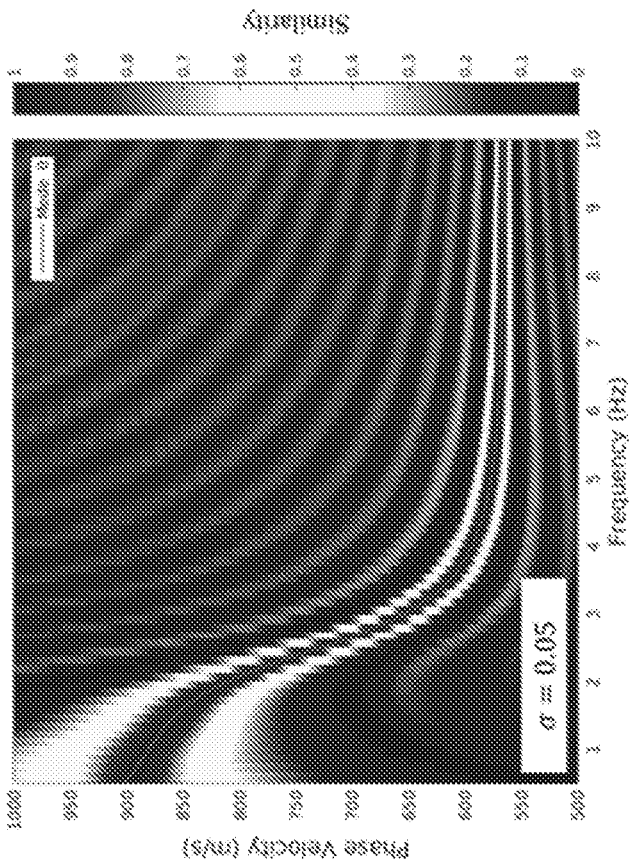
Figures 3E, 3F:
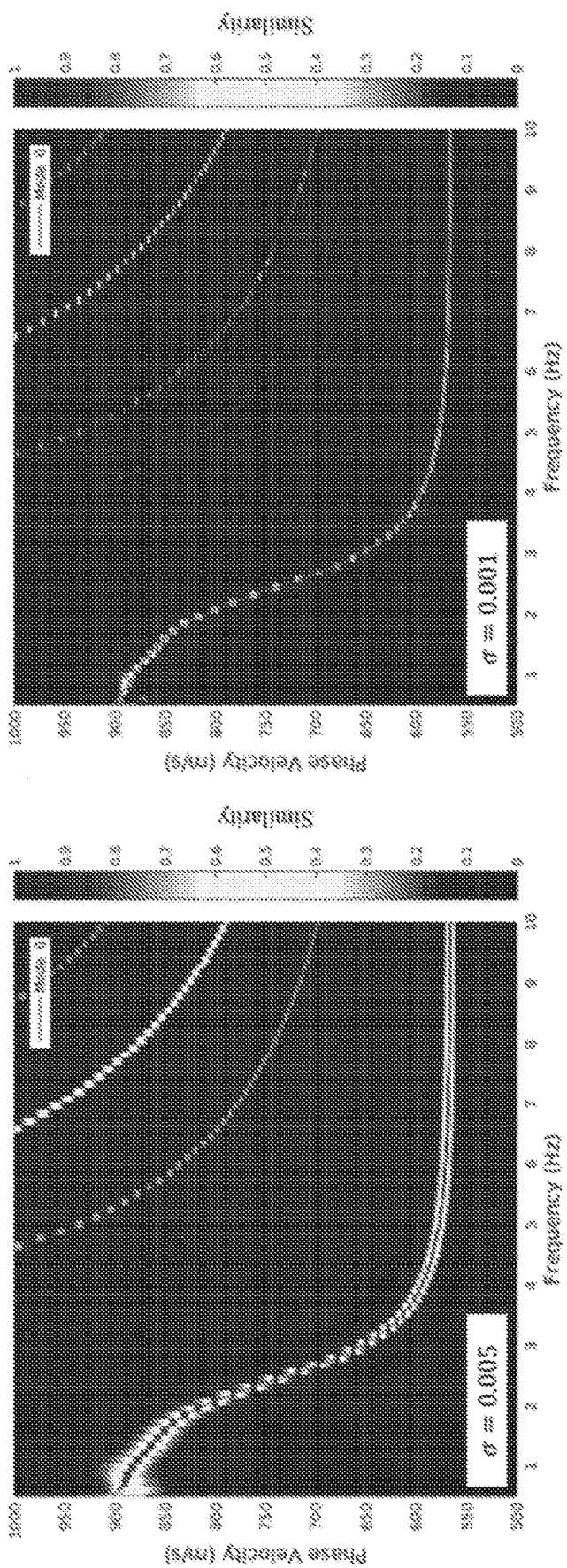

FIG. 2A shows a two-layered model with P-wave (Vp), S-wave (Vs) velocities and the density; FIG. 2B shows vertical-component of the fundamental-mode surface Rayleigh wave. In this example, a simple layered model was used to generate surface Rayleigh waves (FIG. 2A). Only the vertical-component fundamental-mode Rayleigh wave was calculated (FIG. 2B) using the method by Herrmann (2013). Both the source and geophones were placed on the free surface. The source was an explosion with a delta function as its source time function. There were 20 receivers equally spaced at 100 m from the horizontal distance 1000 m to 2900 m. The recording time length was 6 s and the traces were sampled at 4 ms. The data was filtered between 0.1 Hz and 100 Hz. Then these synthetic waveforms were used to calculate the dispersion map by scanning all possible $V_{ph}$ at each frequency (FIG. 3). FIG. 3A shows $S_{LSC}$. FIGS. 3B to 3F are $S_{NLSC}(\omega, V_{ph}; \sigma)$ for σ=10, 0.05, 0.01, 0.005 and 0.001, respectively. The scanned phase-velocity $V_{ph}$ varied from 500 m/s to 1000 m/s while the frequency was from 0.5 Hz to 10 Hz. The solid line is the theoretical dispersion curve.

The linear $S_{LSC}$ result (FIG. 3A) corresponds to the $S_{NLSC}$ result (FIG. 3B) for large σ. If σ is decreased (FIG. 3B-3F), $S_{NLSC}$ map reduces to a line which coincides with the theoretical dispersion curve for the fundamental Rayleigh wave.

EXAMPLE 2

Rayleigh Wave Overtones for a Multi-Layered Model

Figure 4A:
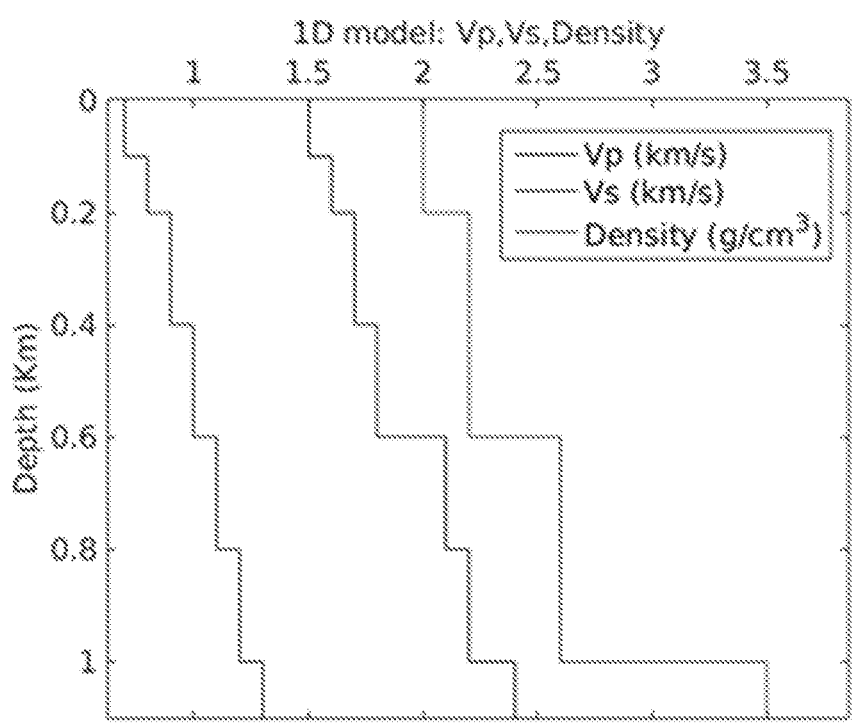
FIG. 4A shows a multi-layer model with Vp in the center, Vs on the left, and density on the right.
Figure 4B:
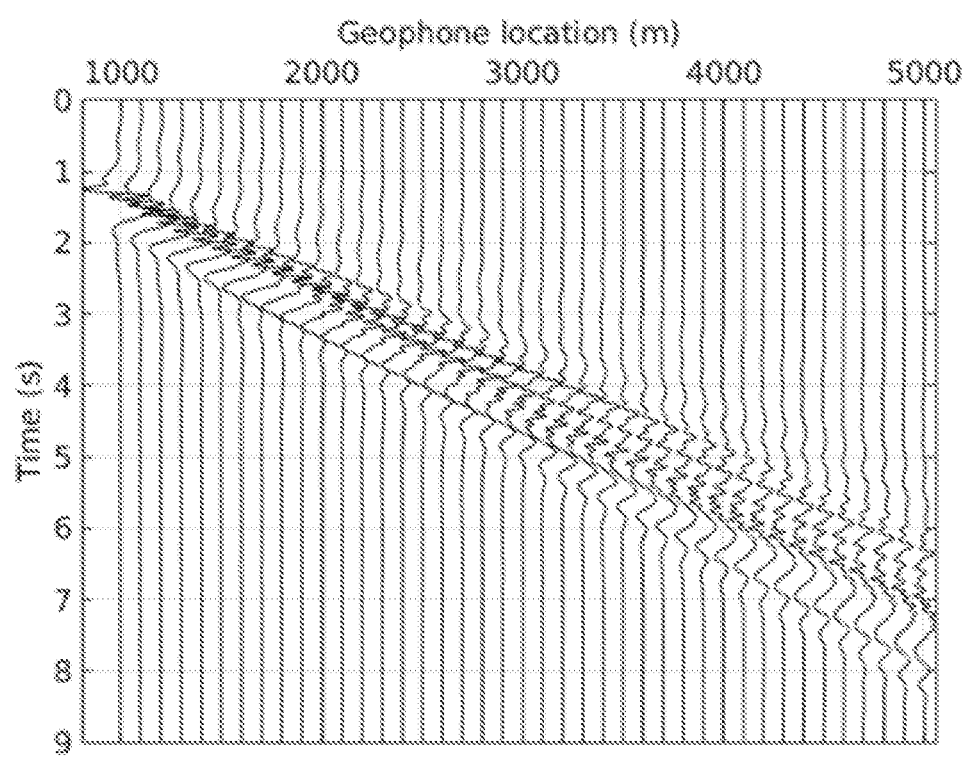
FIG. 4B shows vertical component of the surface Rayleigh waves.

FIG. 4A shows the multi-layer model with Vp, Vs and density; FIG. 4B shows vertical component of the surface Rayleigh waves, which included only the fundamental-mode, and the first two overtones. There were 101 traces at spacing 100 m from the horizontal distance 1000 m to 5000 m on the surface. The source was located horizontal distance 0 m with 200 m depth and was an explosion type. For each trace, the recording time was 9 s, sampled at 4 ms. The frequency was from 0.1 Hz to 100 Hz.

Figures 5A, 5B:
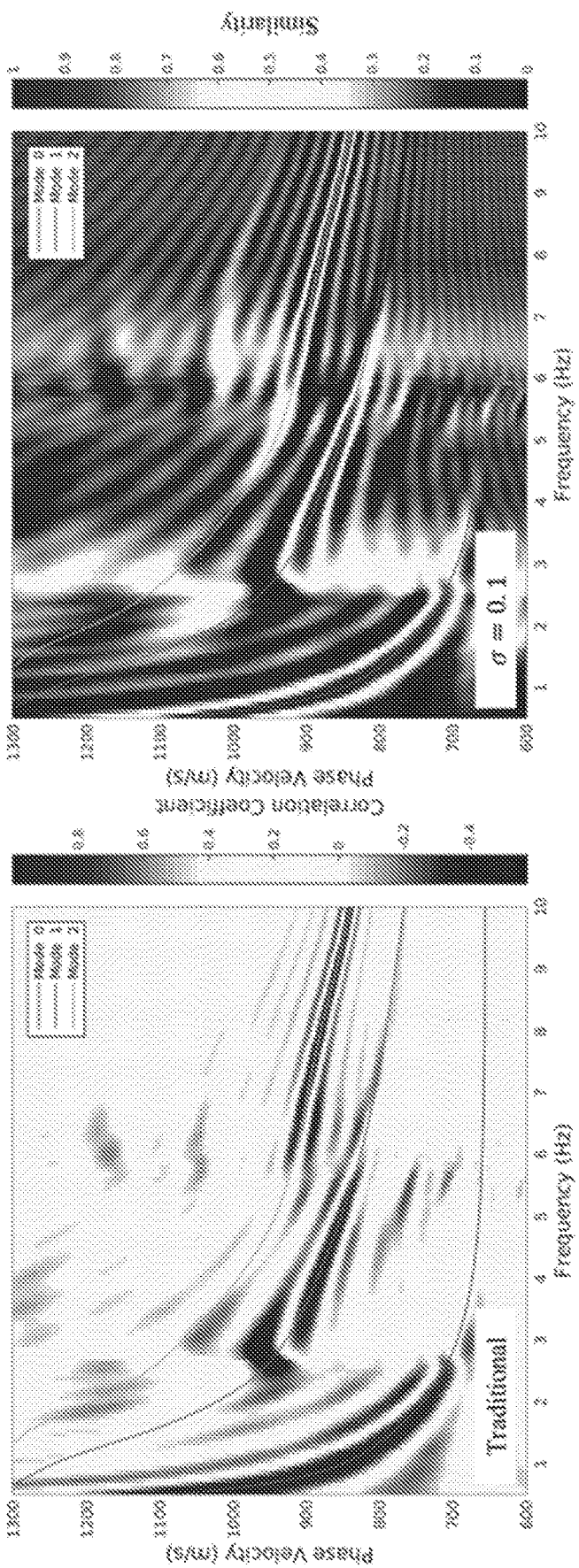
FIG. 5A-5D show images of dispersion curves using the traces in FIG. 4B by the traditional linear measurement and the nonlinear measurement with factor $\sigma$ as 0.1, 0.01 and 0.001, respectively.
Figure 5C:
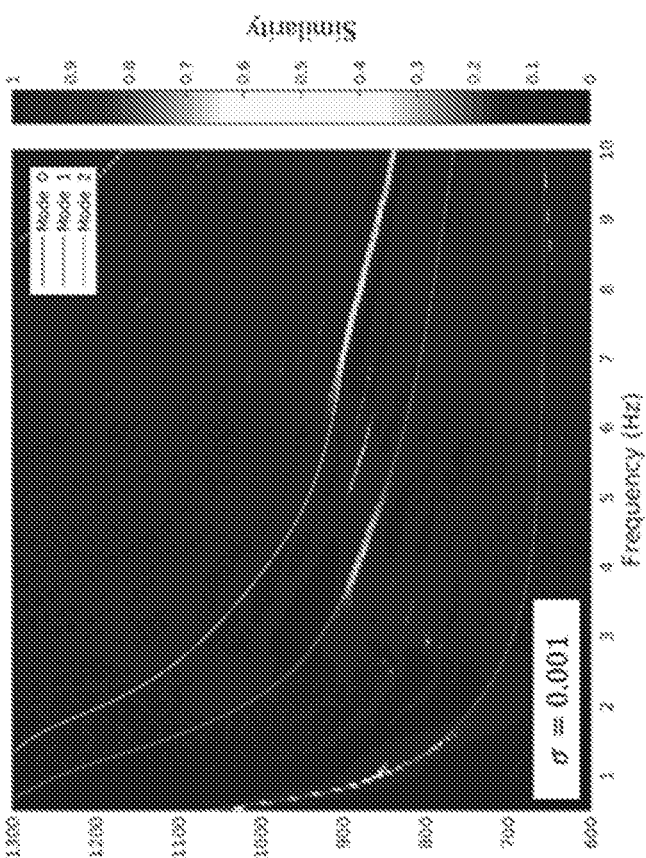
Figure 5D:
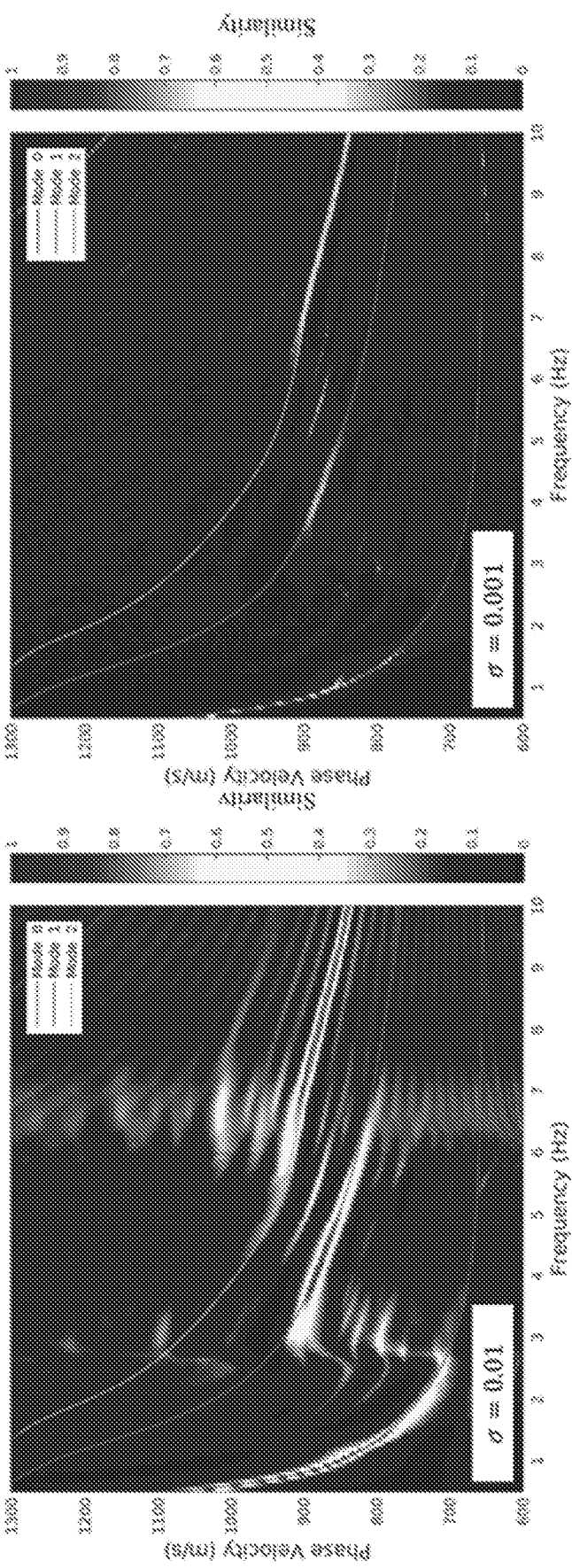

In this second example, a layered model was considered again but with more layers (FIG. 4A). Rayleigh wave overtones were modeled in order to test the NLSC for multi-mode surface waves. Only the fundamental-mode, the first and second overtone were modeled using the method by Herrmann (2013) (FIG. 4B). The traditional dispersion analysis $S_{LSC}$ (FIG. 5A) was compared with $S_{NLSC}(\omega, V_{ph}; \sigma)$ for different σ values (FIG. 5B-5D). FIGS. 5A-5D are the images of dispersion curves using the traces in FIG. 4B by the traditional linear measurement and the nonlinear measurement with factor σ as 0.1, 0.01 and 0.001, respectively. The scanning phase-velocity varied from the 600 m/s to 1300 m/s while the frequency was from 0.5 Hz to 10 Hz. Three solid lines are shown to represent the theoretical dispersion curves for the fundamental mode (mode 0), the first overtone (mode 1), and the second overtone (mode 2), respectively. The 3 Rayleigh-wave modes are clearly seen in both traditional LSC as well as in NLSC. With decreasing σ, the resolution has been sharpened and the dispersion can be more readily picked.

EXAMPLE 3

Rayleigh Wave Dispersion for Mars Using One Station

Zheng et al. (2015) showed that with just a single seismometer on Mars it may be deduced if there is a possible low velocity zone (LVZ) in the Martian lithosphere, if the Rayleigh-wave group velocity dispersion can be measured accurately. For one seismometer, the dispersion can be measured using $R_1$ and $R_3$ (or $R_2$ and $R_4$). The LVZ is related to a possible large thermal gradient in the lithosphere. Therefore, if such an LVZ can be detected using seismology, this has important implications in the inference of martian internal temperature and its planetary evolution and provides a compelling argument for a future martian seismological mission. However, the key step is to achieve a high-resolution dispersion measurement. The goal of this example was to demonstrate the ability of NLSC in extracting a high-resolution dispersion curve using just the seismic recording from one station.

Figure 6A:
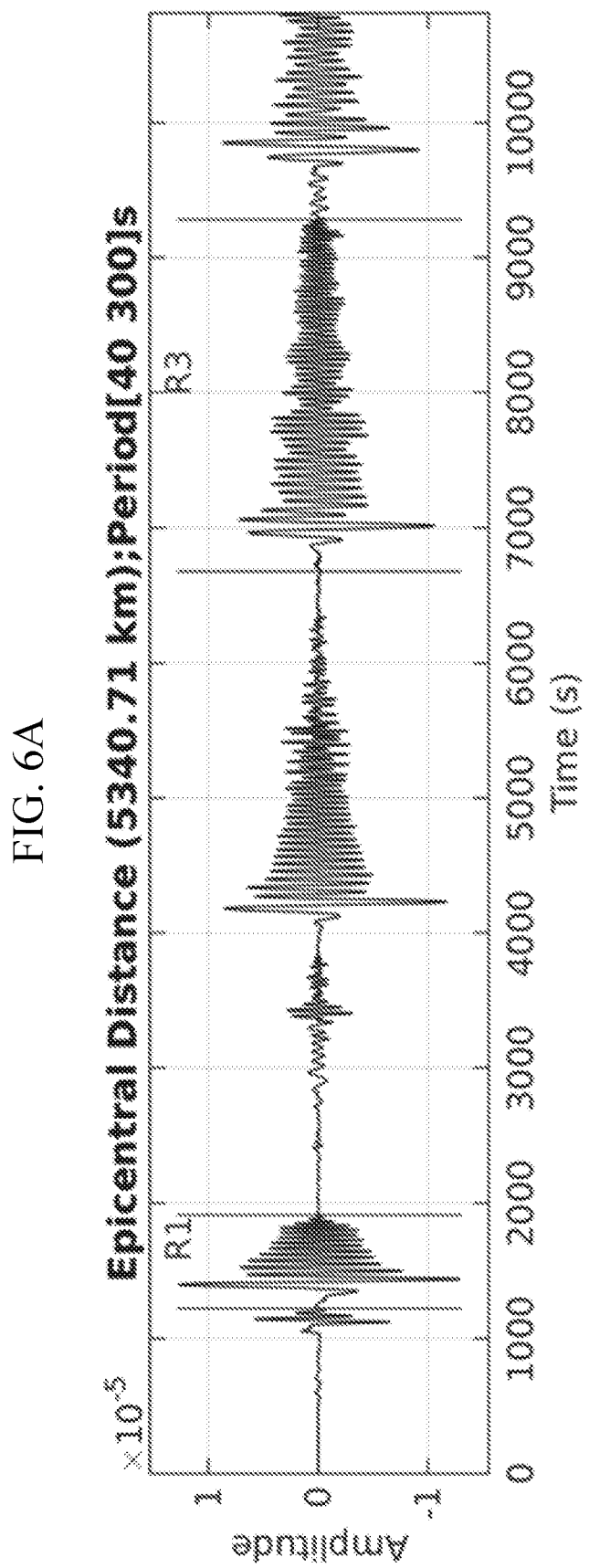
FIG. 6A shows a synthetic vertical-component full waveform for Mars.
Figures 6B, 6C:
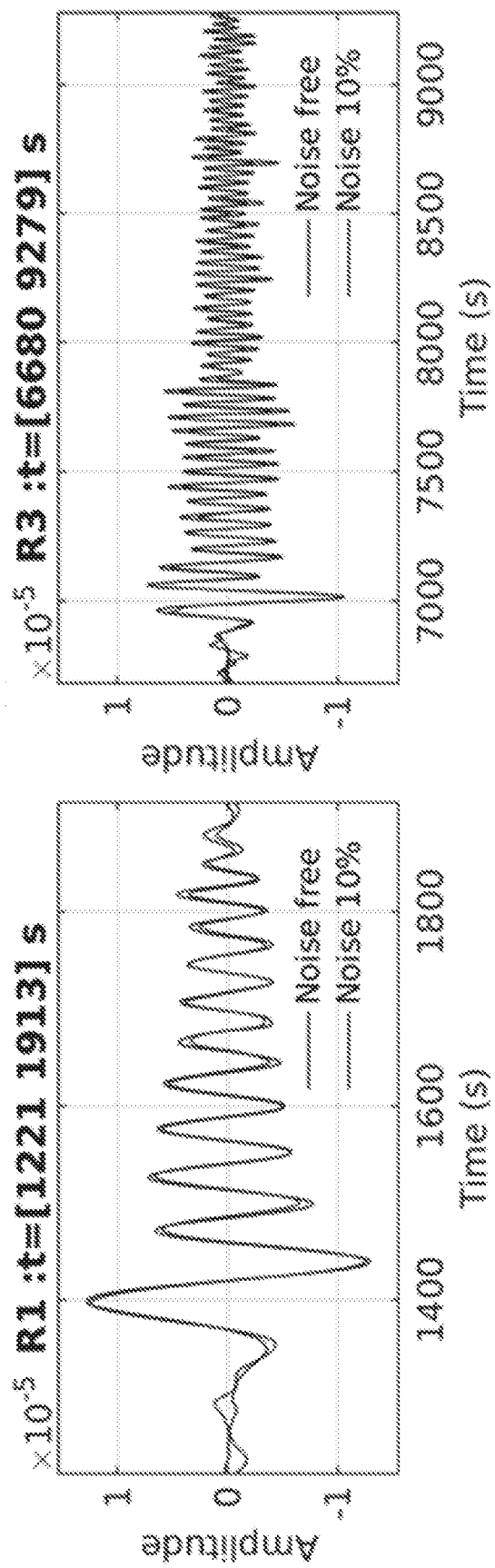
FIG. 6B shows waveforms with and without noise that are a zoomed-in view of $R_1$.
FIG. 6C shows waveforms with and without noise that are a zoomed-in view of $R_3$.

First, synthetic seismograms were generated using the 1-D Martian seismological model constructed by Zheng et al. (2015) with an LVZ. In the original paper, Zheng et al. (2015) used Mineos (Masters et al., 2011) and the direct solution method (DSM) (Geller and Ohminato 1994) to calculate synthetic seismograms. Here the 3-D spectral element method (SEM) (Komatitsch and Tromp, 2002) was used to calculate the synthetic seismogram (FIG. 6). FIG. 6A shows synthetic vertical-component full waveform for Mars. The marsquake epicenter is at (0° E, 0° N) and the source depth is 10 km. The waveform was band-pass filtered between period 40 s to 300 s with a Butterworth filter. The source is double-couple moment-tensor source (Ekstrom et al., 2012), $M_{rr}=M_{tt}=-0.5\times10^{18}$ Nm, $M_{pp}=1\times10^{18}$ Nm, $M_{rt}=0.5\times10^{18}$ Nm, $M_{rp}=M_{tp}=0$. The seismometer was located at (90° E, 0° N) on the surface. The $R_1$ and $R_3$ phases are the global surface Rayleigh waves (Zheng et al., 2015). The waveforms in FIGS. 6B and 6C are the zoomed-in view of the $R_1$ and $R_3$, without noise and with random noise. The noise amplitude is up to 10% of maximum signal amplitude and are bandpass filtered between period 40 s and 300 s.

Figure 7A:
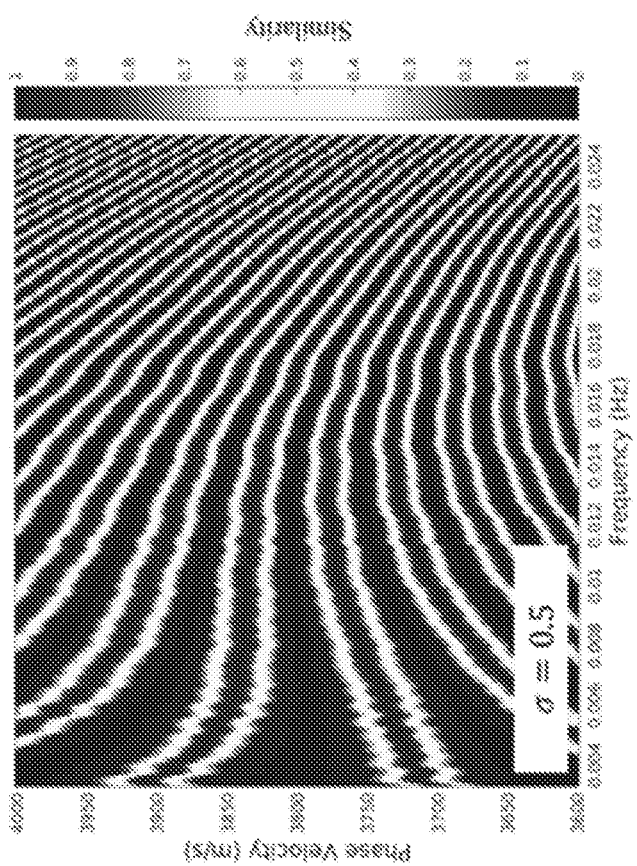
FIG. 7A shows a dispersion map for $S_{LSC}$ using noise-free waveforms in FIGS. 6B and 6C.
Figure 7B:
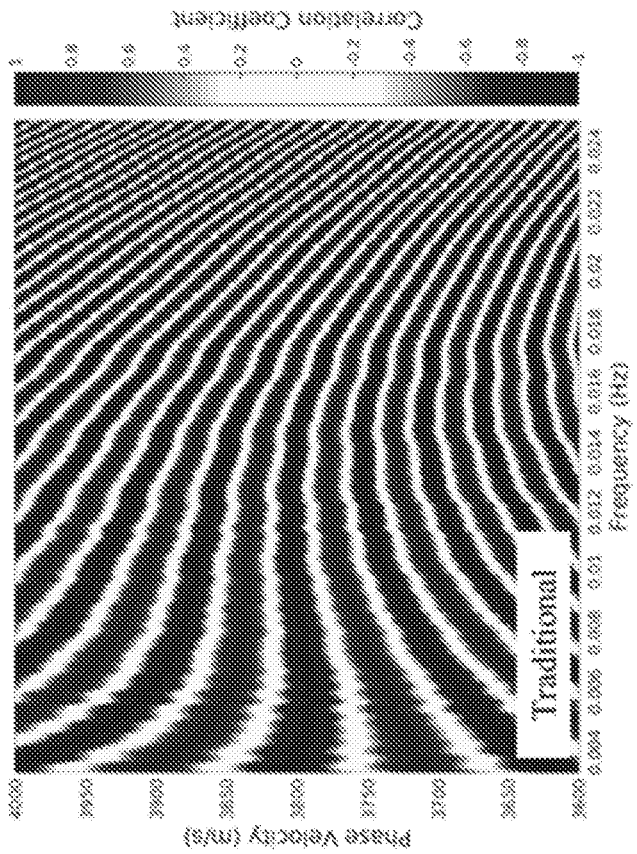
FIG. 7B-7D show dispersion maps for $S_{NLSC}$ for different $\sigma$ values using the noise-free waveforms in FIGS. 6B and 6C.
Figure 7D:
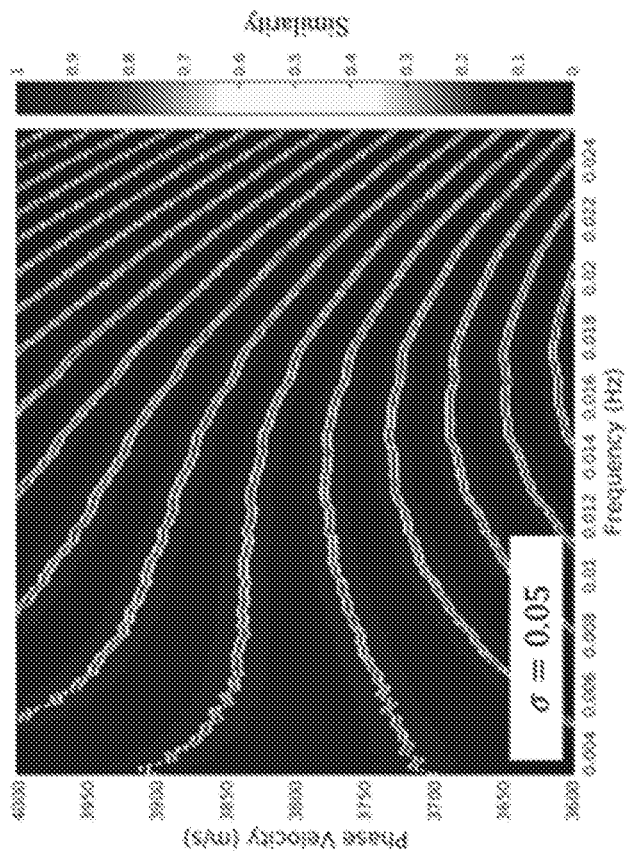
Figure 7C:
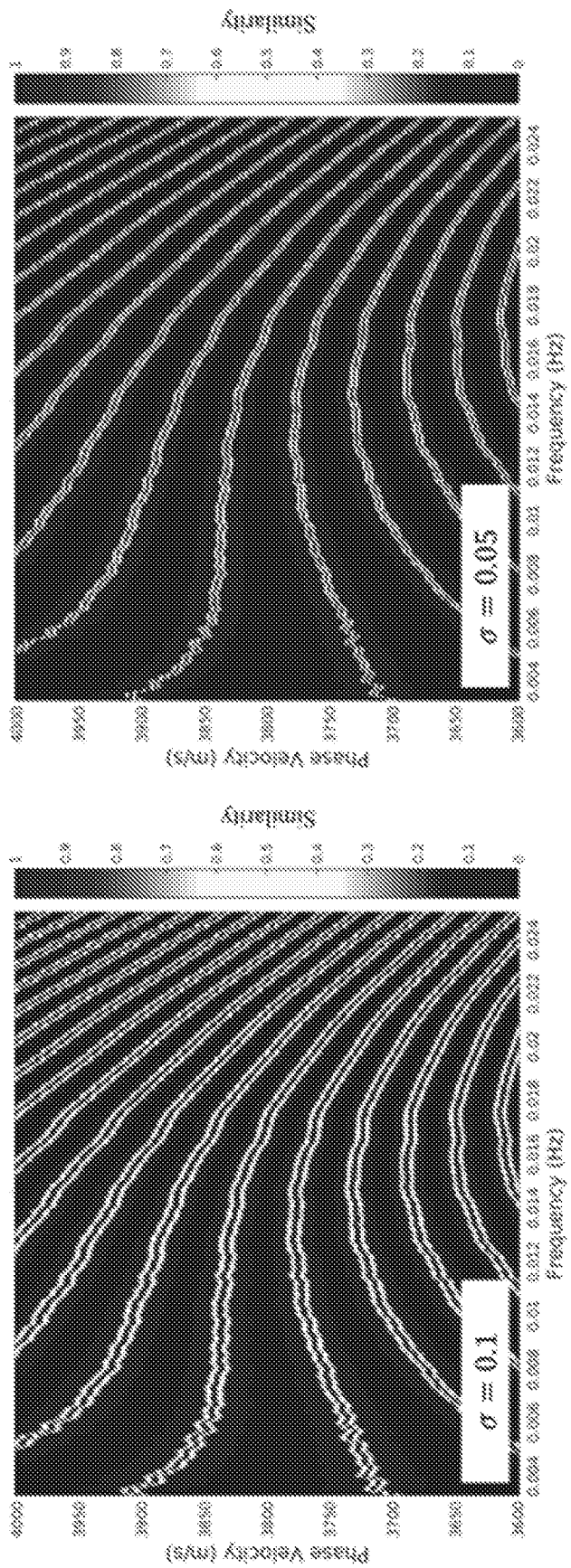

Noise was also added to the synthetic seismic data (FIGS. 6B, 6C). $R_1$ and $R_3$ were used to measure the dispersion. Because the wave propagation distance for $R_1$ and $R_3$ is the great circle distance of Mars which is independent of the location of the marsquake, these two phases were used to measure the dispersion curve and detect the global LVZ. FIG. 7 shows the dispersion map using the noise-free data in FIGS. 6B and 6C by the LSC and the NLSC. FIG. 7A shows $S_{LSC}$ and FIG. 7B-7D show $S_{NLSC}$ for different σ values using the noise-free waveforms in FIGS. 6B and 6C. The scanning phase-velocity varied from the 3600 m/s to 4000 m/s while the scanning frequency range was from 1/40 s to 1/250 s.

Figure 8B:
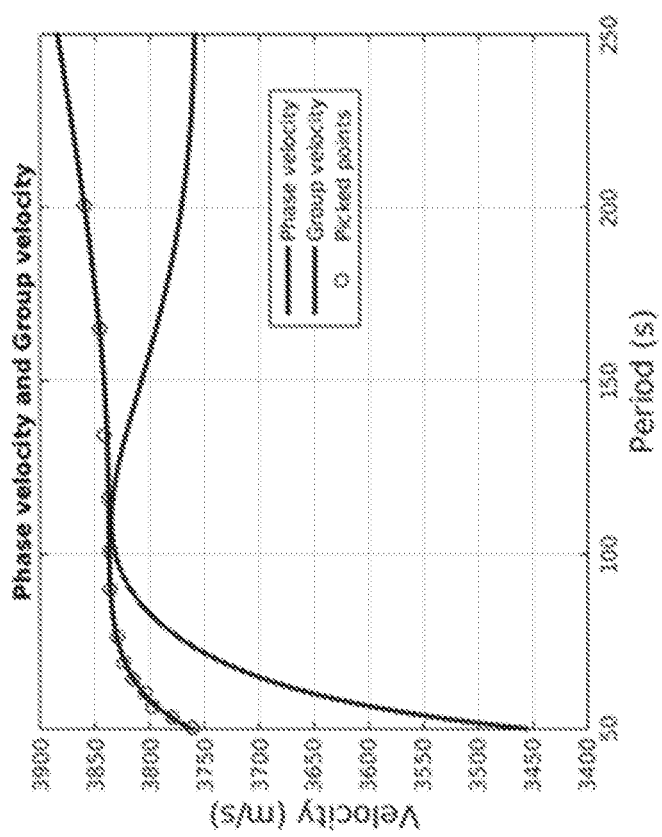
FIG. 8B shows calculated group velocity curve based on the picked $V_{ph}$.
Figure 8A:
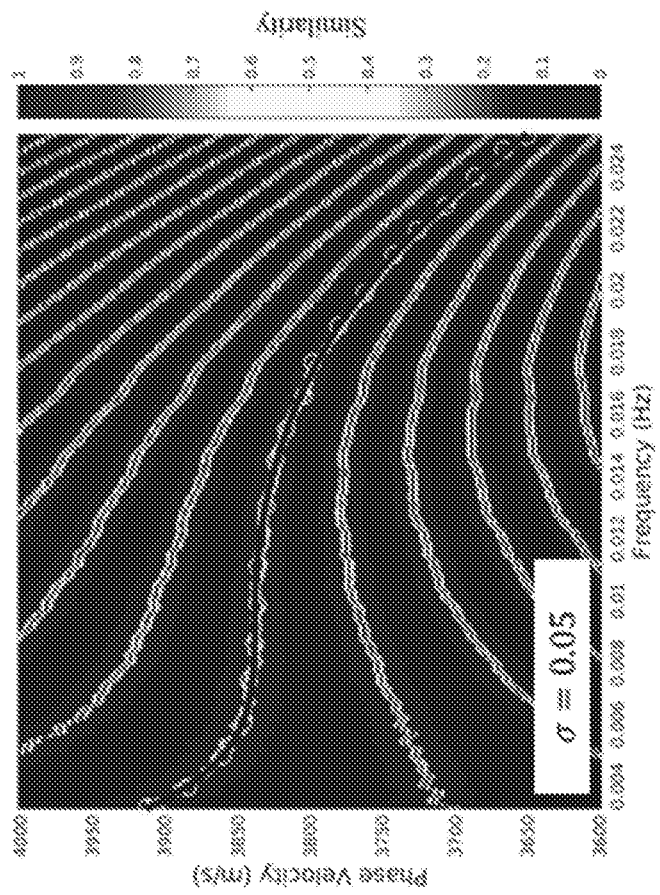
FIG. 8A shows picked phase velocity $V_{ph}$ branch (center, black line) from the $S_{NLSC}$.

FIG. 8A shows the picked phase velocity $V_{ph}$ branch (black line) from the $S_{NLSC}$, and FIG. 8B shows the calculated group velocity curve based on the picked $V_{ph}$. The NLSC shows a significant improvement of the measurement resolution, which can facilitate the phase velocity picking (FIG. 8A). Based on the picked phase velocity dispersion, the group velocity dispersion can be computed (Aki and Richards, 2002, p. 255) (FIG. 8B). With increasing period, the group velocity first increases and reaches a maximum then it decreases, which indicates the existence of the LVZ. This is consistent with the dispersion curve extracted by Zheng et al. (2015) using normal-mode Mineos code and DSM code.

Figure 9A:
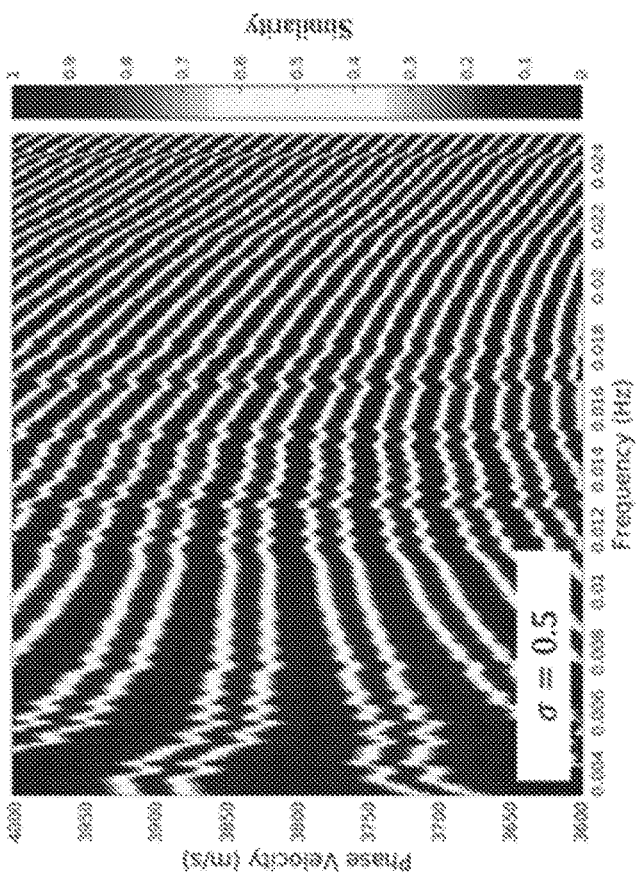
FIG. 9A shows a dispersion map for $S_{LSC}$ using noise-added waveforms in FIGS. 6B and 6C.
Figure 9B:
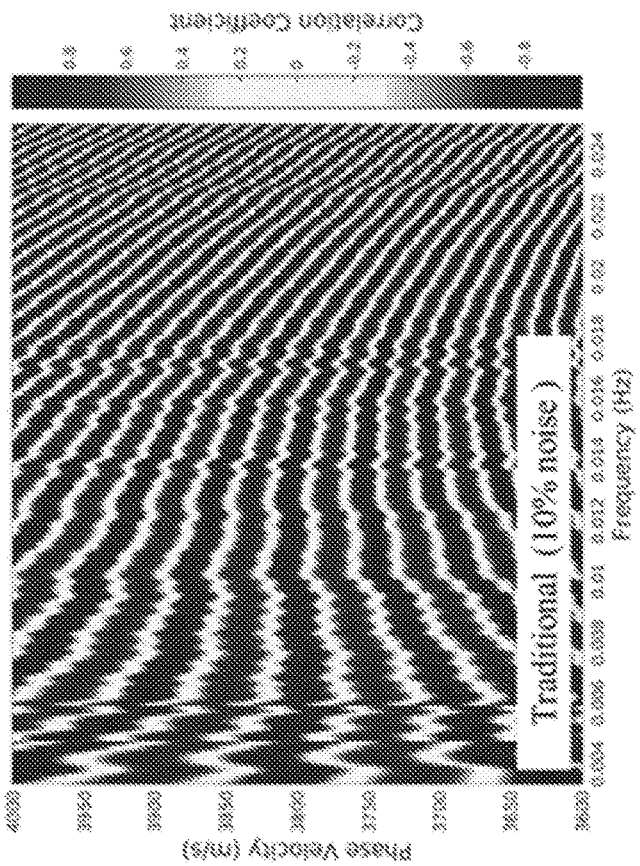
FIG. 9B-9D show dispersion maps for $S_{NLSC}$ for different $\sigma$ values using the noise-added waveforms in FIGS. 6B and 6C.
Figure 9D:
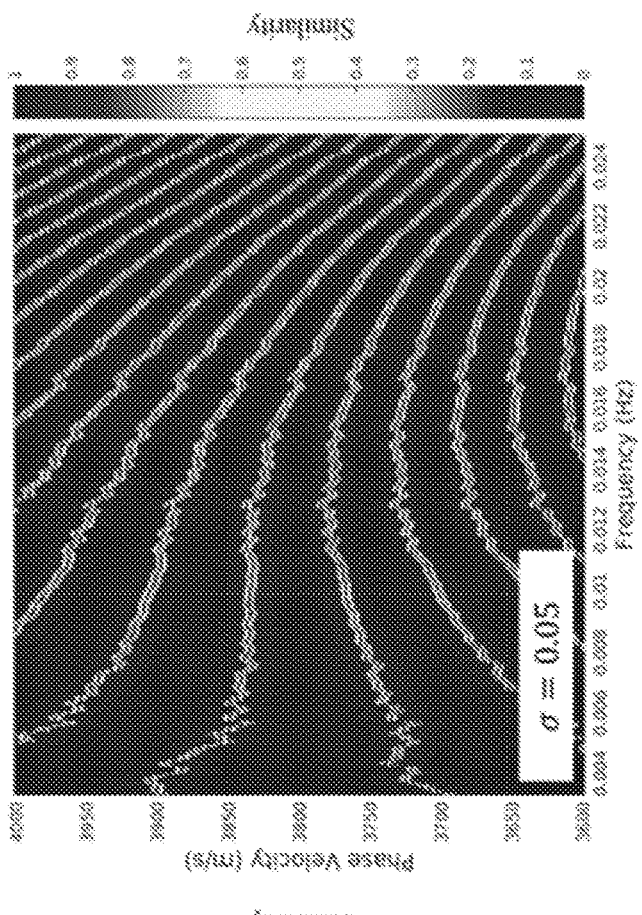
Figure 9C:
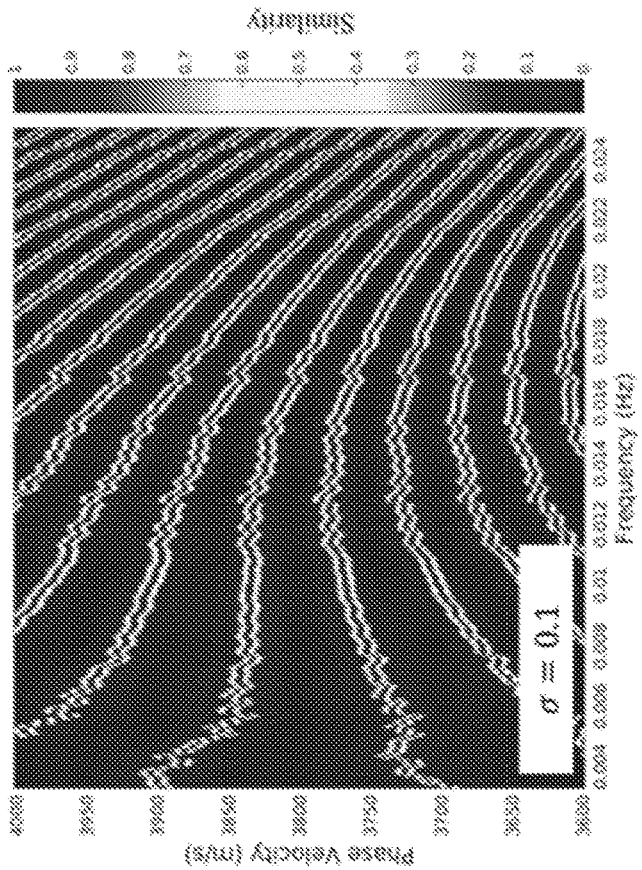

NLSC was also tested using the noise-added data from FIG. 6. FIG. 9A shows $S_{LSC}$ and FIGS. 9B-9D show $S_{NLSC}$ for different σ values using the noise-added waveforms in FIGS. 6B and 6C. The scanning phase-velocity varied from the 3600 m/s to 4000 m/s while the scanning frequency range was from 1/40 s to 1/250 s. The resultant dispersion maps show local discontinuous features due to noise (FIG. 9). However, the NLSC still provides a high-resolution dispersion measurement.

EXAMPLE 4

Land Field Seismic Data in Exploration Seismology

Figure 10B:
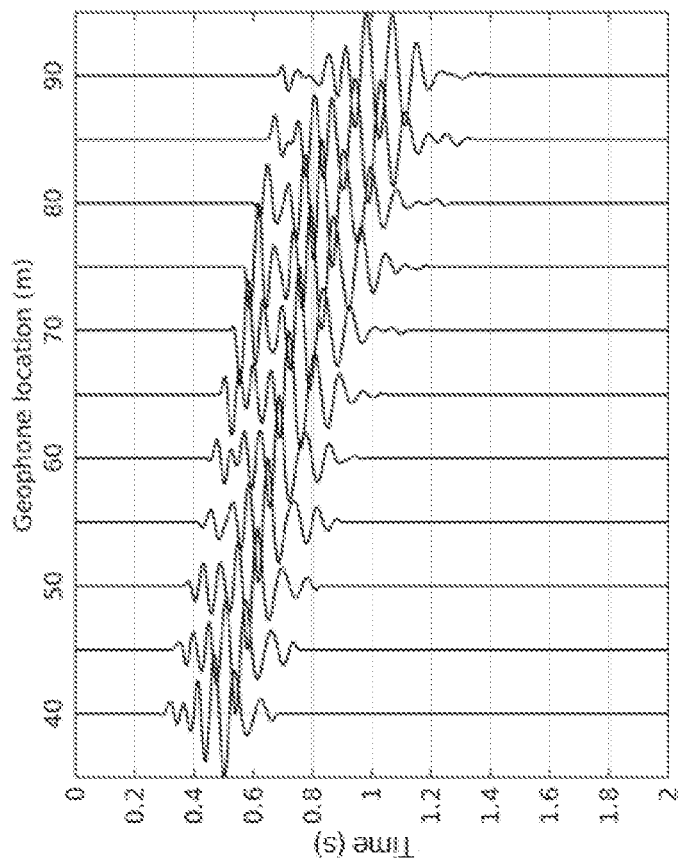
FIG. 10B shows zoomed-in view of the waveform in the dashed window shown in FIG. 10A.
Figure 10A:
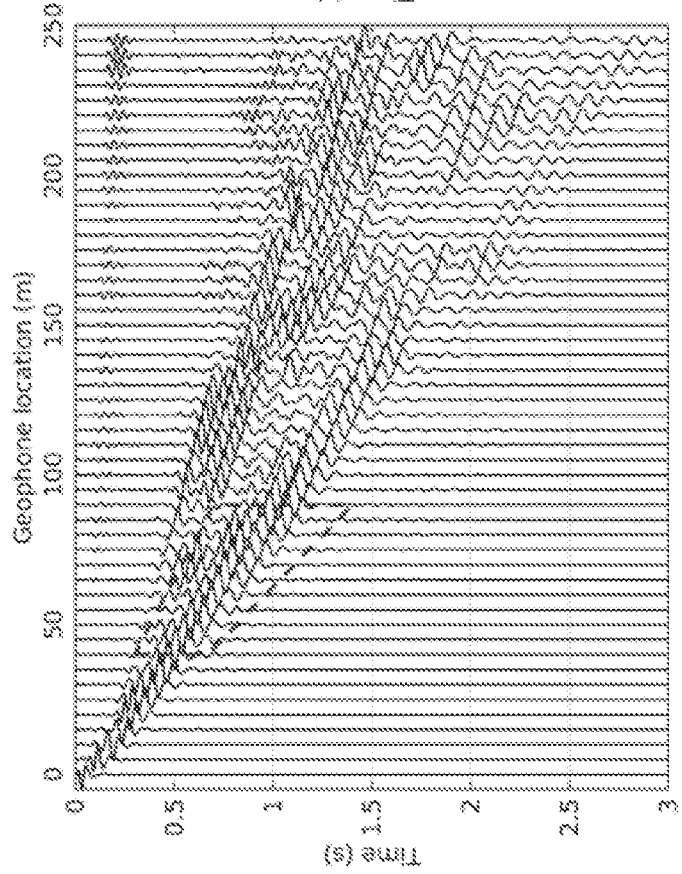
FIG. 10A shows a land field seismic common-shot gather recorded by vertical-component geophones with 51 traces, every 5 m.
Figure 11B:
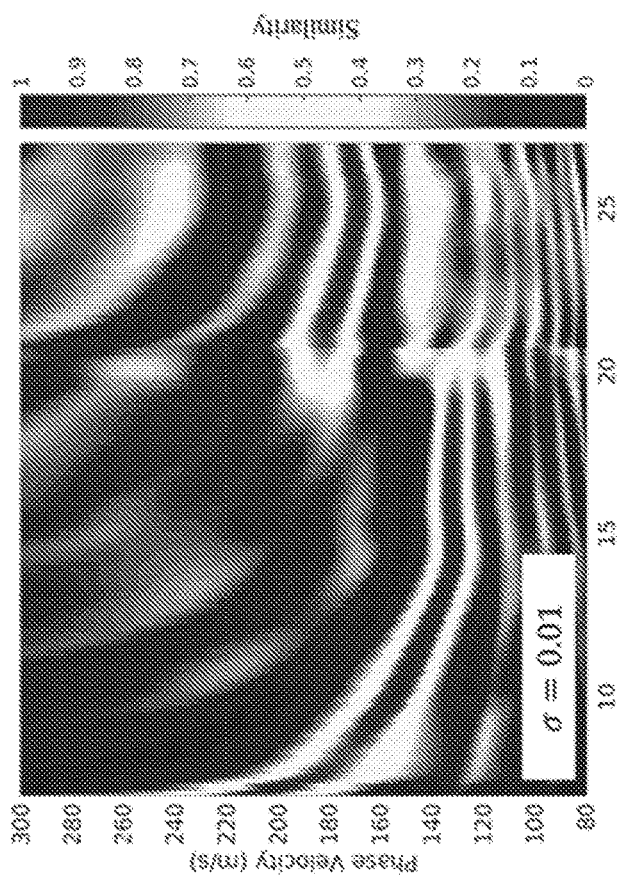
Figure 11A:
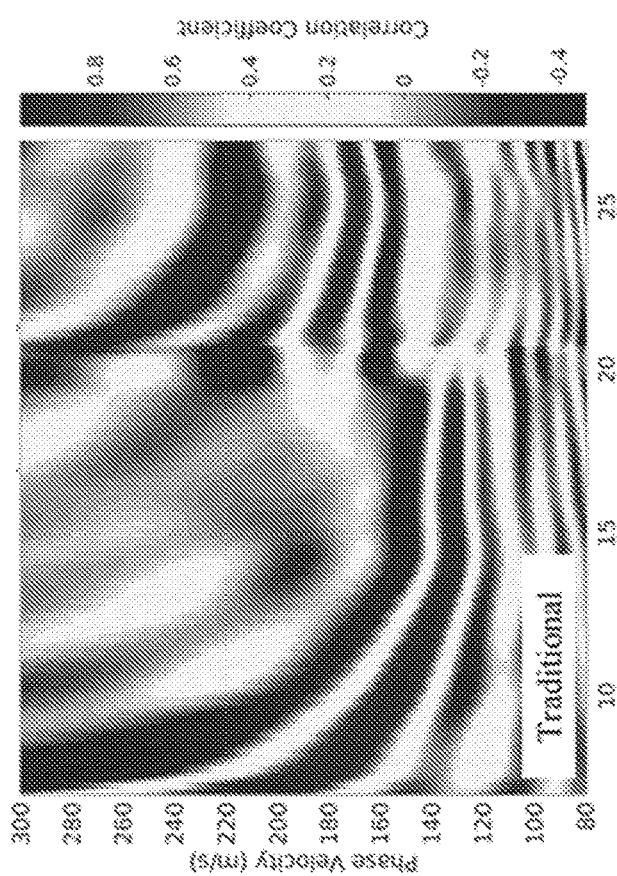
FIG. 11A shows a dispersion map using the field seismic data of FIG. 10A by LSC.

In this example, the nonlinear measurement was tested on an active-source dataset acquired on land. FIG. 10 shows a land field seismic common-shot gather recorded by vertical-component geophones. FIG. 10A shows the gather with 51 traces, every 5 m. The traces were sampled at 2 ms. FIG. 10B shows the zoomed-in view of the waveform in the blue dashed window shown in FIG. 10A. The field seismic common-shot gather was recorded by vertical-component geophones (FIG. 10A). The seismic source was a vertical sledgehammer force at the horizontal distance 0 m. Both the source and the geophones were on the surface. First the surface wave recordings were windowed (FIG. 10B). For each windowed trace, the waveform was bandpass filtered with frequency from 5 Hz to 30 Hz. FIG. 11 shows dispersion maps using the field seismic data by LSC (FIG. 11A) and NLSC with σ being 0.01, 0.005 and 0.001, respectively (FIGS. 11B-11D). The NLSC improved the resolution of the dispersion map which can facilitate velocity picking. In exploration seismology, picking the phase velocities at the low frequencies can be challenging. Using NLSC with different σ values allows identification of the phase velocities readily.

EXAMPLE 5

Ambient Noise Data

Figure 12B:
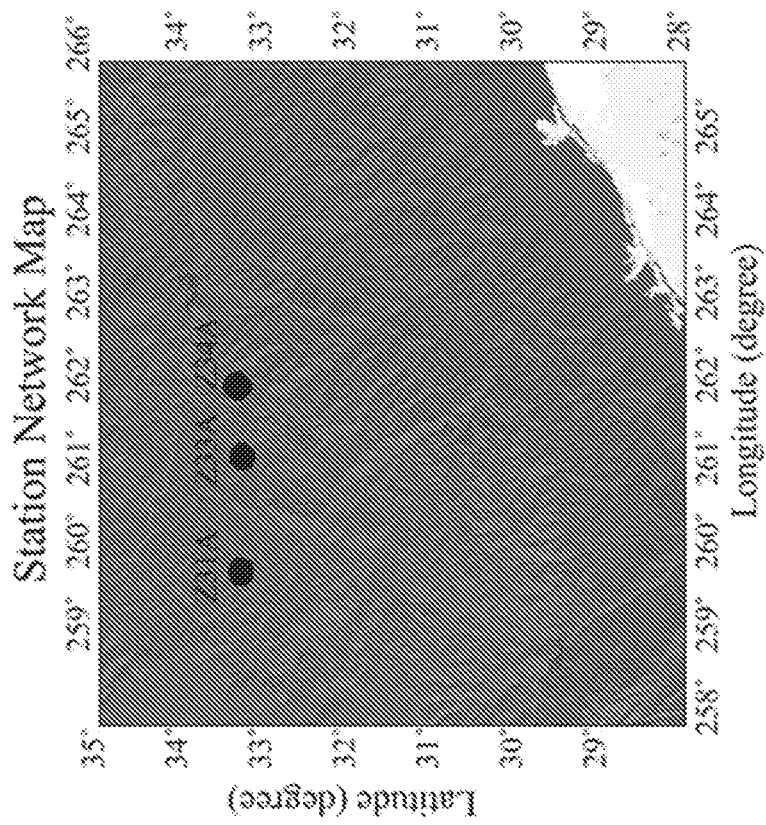
FIG. 12B shows ambient noise crosscorrelograms between station Z31A and Z33A; and between Z31A and Z34A.
Figure 12A:
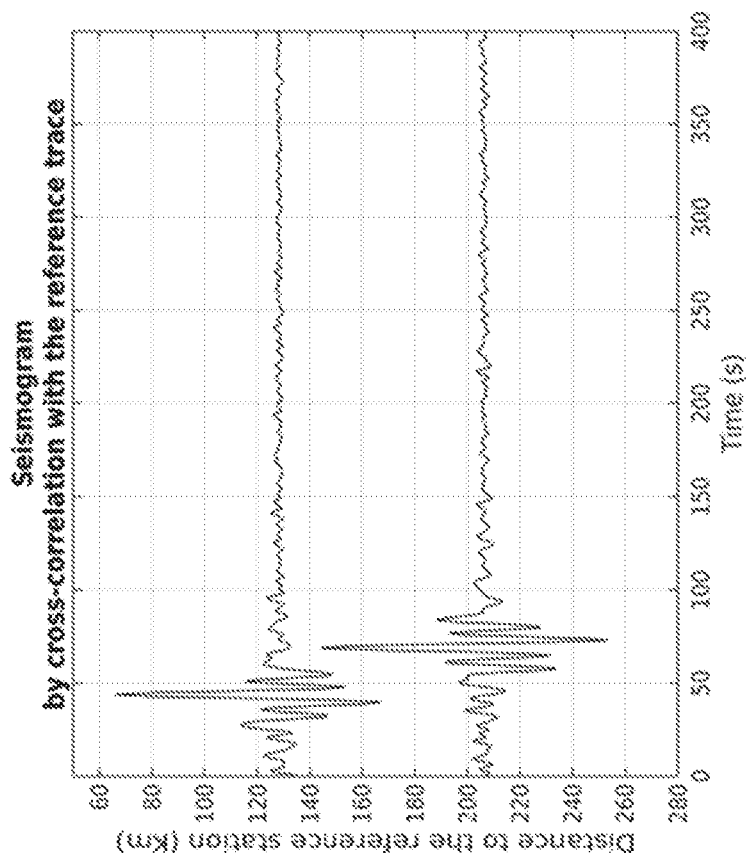
FIG. 12A shows three stations in the TA network.
Figure 13B:
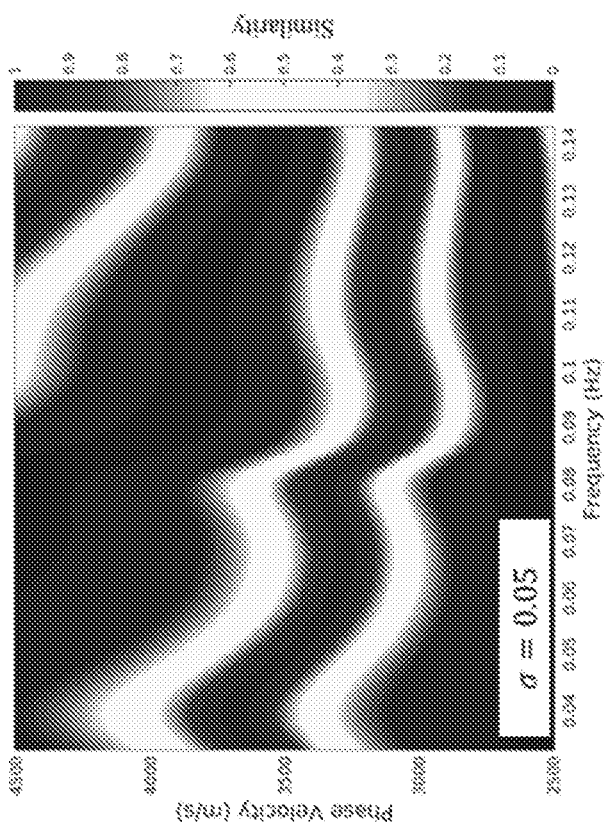
FIG. 13B-13D show dispersion maps using the ambient noise data of FIG. 12B by NLSC with $\sigma$ being 0.01, 0.005 and 0.001, respectively.
Figure 13A:
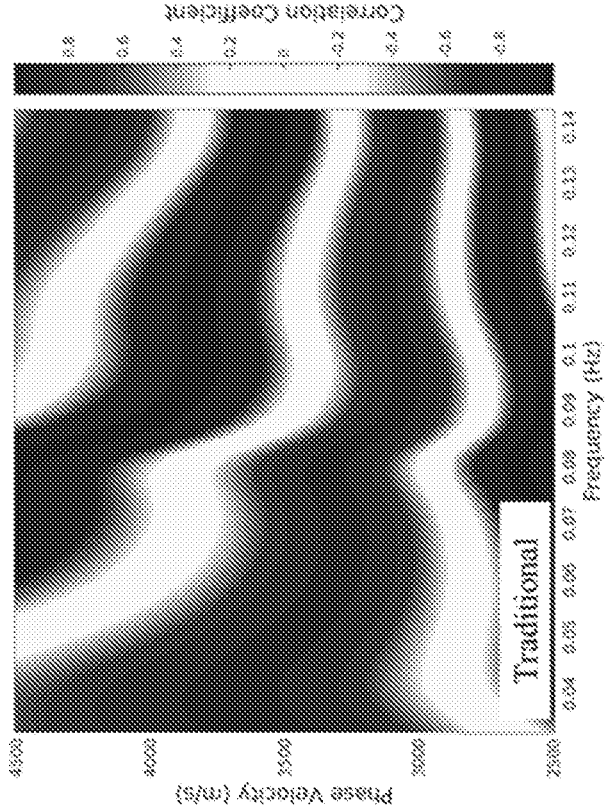
FIG. 13A shows a dispersion map using the ambient noise data of FIG. 12B by LSC.
Figure 13D:
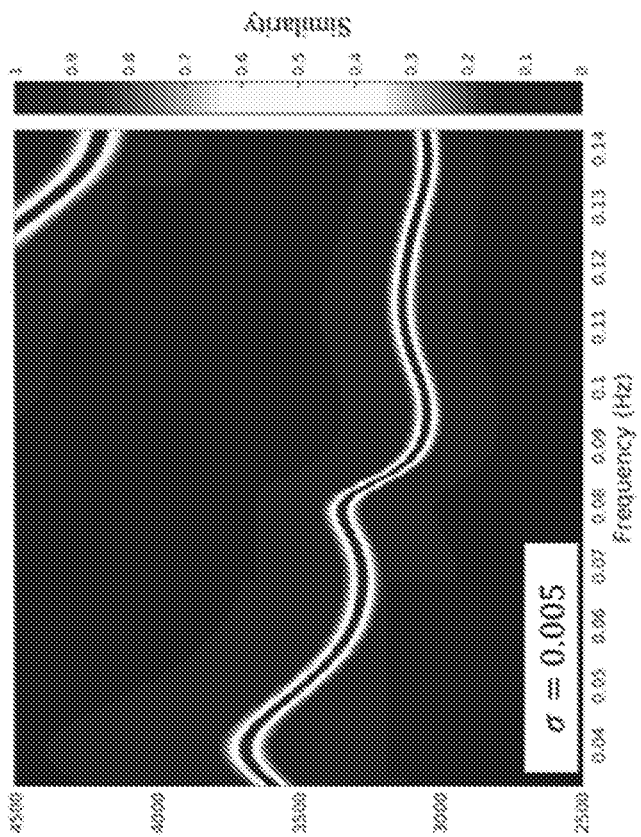
Figure 13C:
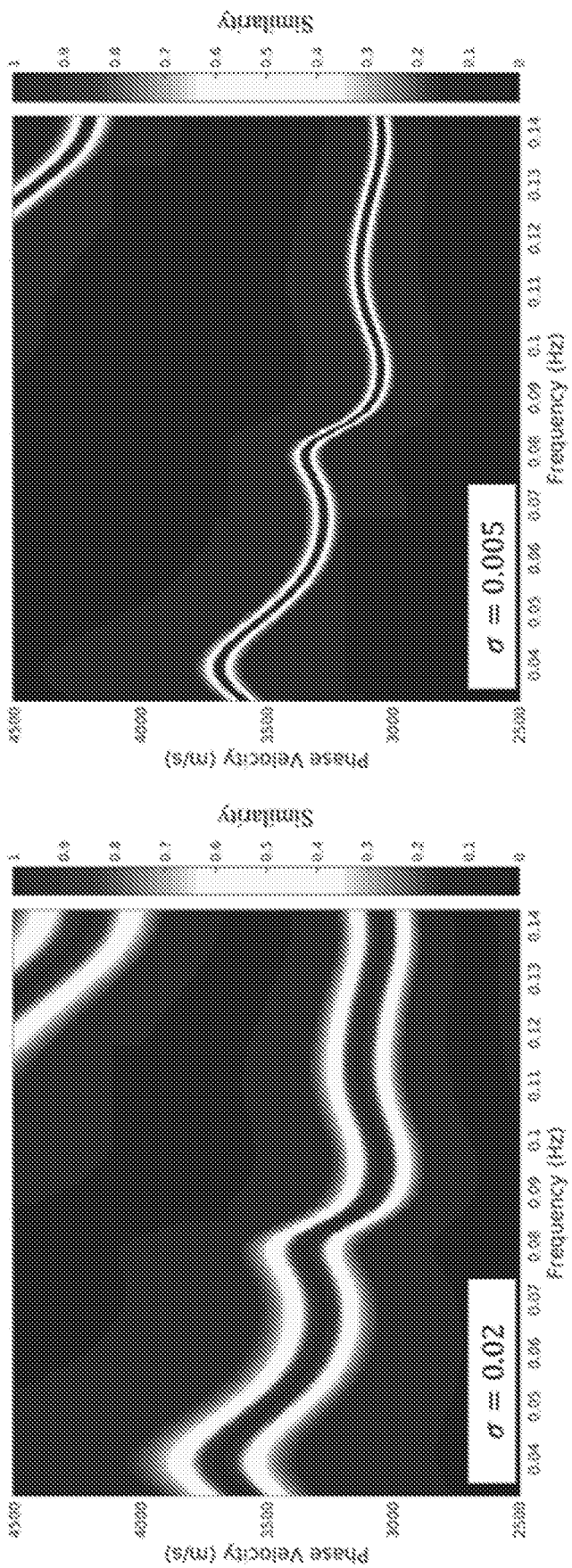

The crosscorrelation of the ambient noise between receivers can extract surface waves which can provide valuable new information about the subsurface velocity structure (Campillo and Paul, 2003; Shapiro et al., 2005). In this example, the noise (12 months of noise data) recorded by 3 stations of the USArray was crosscorrelated to extract the station pairwise Rayleigh waves (FIG. 12). FIG. 12A shows three stations in the TA network. FIG. 12B shows ambient noise crosscorrelograms between station Z31A and Z33A; and between Z31A and Z34A. These two seismograms are formed using one-year worth of noise data (May 1, 2010 to Feb. 28, 2011) recorded by the USArray. The data was downloaded from the Incorporated Research Institutions for Seismology (IRIS). FIG. 13 shows the dispersion map by LSC and NLSC with different σ. FIG. 13 dispersion maps using the ambient noises data by LSC (FIG. 13A) and NLSC with σ being 0.05, 0.02 and 0.005, respectively (FIG. 13B-13D). The scanning phase-velocity varied from the 2500 m/s to 4500 m/s while the scanning frequency range was from 1/(30 s) to 1/(7 s) ([0.14 0.02] Hz). In FIG. 13A, the LSC produced a broad dispersion map, especially at the low frequency end. This has been commonly observed in surface wave dispersion measure in numerous previous studies. Often the broad lobe is interpreted as "error" in the phase velocity measurement. This is incorrect. Long-period surface waves should be less affected by near surface scattering. Therefore, the error in the phase velocity at the low frequency should be small. However, with the NLSC method (FIG. 13B-13D), with decreasing σ value, a narrow dispersion map was achieved, which greatly aids the dispersion curve picking with high fidelity. Other methods like the N-th root or N-th power of the dispersion map (Mcfadden et al., 1986) cannot achieve uniform sensitivity over all frequencies.

REFERENCES

The following documents and publications are hereby incorporated by reference.

Herrmann [2013] (http://www.eas.slu.edu/eqc/eqccps.html), last accessed February 2016.

Komatitsch and Tromp, 2002 (SPECFEM3D, https://geodynamics.org/cig/software/specfem3d_globe/, last accessed February 2016.

Aki, K., and P. G. Richards (2002), *Quantitative seismology*.

Campillo, M., and A. Paul (2003), Long-range correlations in the diffuse seismic coda, *Science*, 299(5606), 547-549, doi:DOI 10.1126/science.1078551.

Claerbout, J. F. (1985), *Imaging the earth's interior*, xv, 398 p. pp., Blackwell Scientific Publications, Oxford England; Boston.

Ekstrom, G., M. Nettles, and A. M. Dziewonski (2012), The global CMT project 2004-2010: Centroid-moment tensors for 13,017 earthquakes, *Phys Earth Planet In*, 200, 1-9, doi:10.1016/j.pepi.2012.04.002.

Foster, A., G. Ekstrom, and M. Nettles (2014), Surface wave phase velocities of the Western United States from a two-station method, *Geophysical Journal International*, 196(2), 1189-1206, doi:10.1093/gji/ggt454.

Geller, R. J., and T. Ohminato (1994), Computation of synthetic seismograms and their partial derivatives for heterogeneous media with arbitrary natural boundary conditions using the Direct Solution Method, *Geophysical Journal International*, 116(2), 421-446, doi:10.1111/j.1365-246X.1994.tb01807.x.

Herrmann, R. B. (2013), Computer Programs in Seismology: An Evolving Tool for Instruction and Research, *Seismological Research Letters*, 84(6), 1081-1088, doi: 10.1785/0220110096.

Knopoff, L., S. Mueller, and W. L. Pilant (1966), Structure of the crust and upper mantle in the ALPS from the phase velocity of Rayleigh waves, *Bulletin of the Seismological Society of America*, 56(5), 1009-1044.

Komatitsch, D., and J. Tromp (2002), Spectral-element simulations of global seismic wave propagation—II. Three-dimensional models, oceans, rotation and self-gravitation, *Geophysical Journal International*, 150(1), 303-318, doi:DOI 10.1046/j.1365-246X. 2002.01716.x.

Luo, Y. H., J. H. Xia, R. D. Miller, Y. X. Xu, J. P. Liu, and Q. S. Liu (2008), Rayleigh-wave dispersive energy imaging using a high-resolution linear Radon transform, *Pure and Applied Geophysics*, 165(5), 903-922, doi:10.1007/s00024-008-0338-4.

Masters, G., M. Barmine, and S. Kientz (2011), Mineos (version 1.0.2), Computational Infrastructure for Geodynamics (CIG), <www.geodynamics.org>(last accessed 2.10.2014).

Mcfadden, P. L., B. J. Drummond, and S. Kravis (1986), The Nth-Root Stack—Theory, Applications, and Examples, *Geophysics*, 51(10), 1879-1892.

Mcmechan, G. A., and R. Ottolini (1980), Direct Observation of a P-Tau Curve in a Slant Stacked Wave Field, *Bulletin of the Seismological Society of America*, 70(3), 775-789.

Mcmechan, G. A., and M. J. Yedlin (1981), Analysis of Dispersive Waves by Wave Field Transformation, *Geophysics*, 46(6), 869-874, doi:Doi 10.1190/1.1441225.

Nazarian, S., and K. Stokoe (1984), In situ shear wave velocities from spectral analysis of surface waves, *Proceedings of the world conference on Earthquake Engineering*, 8, 21-28.

Nolet, G. (1975), Higher Rayleigh Modes in Western-Europe, *Geophys Res Lett*, 2(2), 60-62.

Park, C. B., R. D. Miller, and J. H. Xia (1999), Multichannel analysis of surface waves, *Geophysics*, 64(3), 800-808, doi:Doi 10.1190/1.1444590.

Ross, W. S., and S. Lee (2012), Dispersion estimation by nonlinear optimization of beam-formed fields, edited, U.S. Patent 20120330554, Dec. 28, 2012.

Sato, Y. (1957), Attenuation, dispersion, and the wave guide of the G wave, *Bull. Seismol. Soc. Am.*, 48(3), 231-251.

Shapiro, N. M., M. Campillo, L. Stehly, and M. H. Ritzwoller (2005), High-resolution surface-wave tomography from ambient seismic noise, *Science*, 307(5715), 1615-1618, doi:10.1126/science.1108339.

Shen, C., A. Wang, L. M. Wang, Z. B. Xu, and F. Cheng (2015), Resolution equivalence of dispersion-imaging methods for noise-free high-frequency surface-wave data, *Journal of Applied Geophysics*, 122, 167-171, doi: 10.1016/j.jappgeo.2015.09.019.

Stoffa, P. L., P. Buhl, and J. Diebold (1980), The Direct Mapping of Seismic Data to the Domain of Intercept Time and Ray Parameters—a Plane-Wave Decomposition, *Geophysics*, 45(4), 540-540.

Strobbia, C., and S. Foti (2006), Multi-offset phase analysis of surface wave data (MOPA), *Journal of Applied Geophysics*, 59(4), 300-313, doi:10.1016/j.jappgeo.2005.10.009.

Tang, X. M., and C. H. A. Cheng (2004), Quantitative borehole acoustic methods, 1st ed., xviii, 255 p. pp., Elsevier, Amsterdam; Boston.

Tarantola, A. (1984), Inversion of Seismic-Reflection Data in the Acoustic Approximation, *Geophysics*, 49(8), 1259-1266, doi:Doi 10.1190/1.1441754.

Xia, J. H., Y. X. Xu, and R. D. Miller (2007), Generating an image of dispersive energy by frequency decomposition and slant stacking, *Pure and Applied Geophysics*, 164(5), 941-956, doi:10.1007/s00024-007-0204-9.

Yao, H., R. D. van Der Hilst, and M. V. de Hoop (2006), Surface-wave array tomography in SE Tibet from ambient seismic noise and two-station analysis—I. Phase velocity maps, *Geophysical Journal International*, 166(2), 732-744.

Zheng, Y. C., F. Nimmo, and T. Lay (2015), Seismological implications of a lithospheric low seismic velocity zone in Mars, *Phys Earth Planet In*, 240, 132-141, doi:10.1016/j.pepi.2014.10.004.

What is claimed is:

1. A method for comparing seismic signals for dispersion analyses for use in analyzing properties of a material, comprising:

propagating a wave through a material, wherein a first receiver and a second receiver are located in the material, wherein the second receiver is located at a distance x from the first receiver, wherein the wave propagates through the first receiver and the second receiver, and wherein the first receiver and the second receiver perform measurements of the wave;

assigning a first time series waveform $d_1(t)$ for the wave propagating through the material at the first receiver;

assigning a second time series waveform $d_x(t)$ for the wave propagating through the material at the second receiver, wherein the first and second time series waveforms relate to pressure, particle displacement, or velocity;

calculating a non-linear signal comparison measurement $S_{NL}(\omega, V_{ph})$ using collected data and the equation:

$$S_{NL}(\omega, V_{ph}) = \frac{1}{T}\int_0^T \exp\left(-\frac{\left[\bar{d}_1(t;\omega) - \bar{d}_x\left(t + \frac{x}{V_{ph}}; \omega\right)\right]^2}{4\omega^2\pi^{-2}\sigma^2}\right)dt,$$

wherein T is a selected length of time for a window of interest, $d_1(t;\omega)$ is a variance-normalized seismic waveform for $d_1(t)$ filtered around frequency $\omega$ and is equal to $\sigma_1^{-1} d_1(t;\omega)$ wherein $\sigma_1$ is variance or an energy-related measure of the collected data, $$\bar{d}_x\left(t + \frac{x}{V_{ph}}; \omega\right)$$

is a variance-normalized seismic waveform for $d_x(t)$ filtered around frequency $\omega$ and is equal to $$\sigma_x^{-1}\bar{d}_x\left(t + \frac{x}{V_{ph}}; \omega\right)$$

wherein $V_p h$ is phase velocity equal to x divided by t and wherein $\sigma_x$ is variance or an energy-related measure of the collected data, and $\sigma$ is an overall continuous nonnegative parameter for controlling overall resolution;

calculating a background measurement $S_\pi$, for the non-linear signal comparison measurement $S_{NL}(\omega, V_{ph})$ using the equation:

$$S_\pi = I_0(b)e^{-b}$$

wherein $\sigma$ is a modified Bessel function of zero-th order, and $$b = \frac{\pi^2}{\sigma^2\omega^2 T};$$

and calculating a normalized and scaled non-linear signal comparison measurement $S_{NLSC}(\omega, V_{ph};\sigma)$ using the equation:

$$S_{NLSC}(\omega, V_{ph};\sigma) = \frac{S_{NL}(\omega, V_{ph}) - S_\pi}{1 - S_\pi},$$

wherein $\sigma$ is chosen from zero to infinity, and wherein $S_{NLSC}(\omega, V_{ph};\sigma)$ measures sensitivity to a time shift and velocity and provides signal comparison information for the wave at the first and second receivers; and using the signal comparison information in dispersion analyses to calculate properties, characteristics, or structures of the material.

2. The method of claim 1, wherein the first receiver and the second receiver are part of a set of multiple receivers and the steps of the method are repeated to provide signal comparison information for the wave at additional receivers.

3. The method of claim 1, further comprising the step of using the signal comparison information in borehole acoustic logging.

4. The method of claim 1, wherein the signal comparison information is used in seismic imaging and migration, wherein the first time series waveform is assigned as a downgoing forward propagated wavefield, and wherein the second time series waveform is assigned as a backward extrapolated receiver wavefield.

5. The method of claim 1, wherein the signal comparison information is used in seismic waveform inversion, wherein the first time series waveform is assigned as a modeled waveform, and wherein the second time series waveform is assigned as an actually recorded wavefield.

6. The method of claim 1, wherein $\sigma$ is chosen to be in the range of 0.001 to 10.

* * * * *

UNITED STATES PATENT AND TRADEMARK OFFICE
CERTIFICATE OF CORRECTION

PATENT NO. : 11,209,566 B2
APPLICATION NO. : 16/310934
DATED : December 28, 2021
INVENTOR(S) : Yingcai Zheng It is certified that error appears in the above-identified patent and that said Letters Patent is hereby corrected as shown below:

On the Title Page

1. In Item (87), under "PCT Pub. No.", in Column 1, Line 1, delete "WO2017/233079" and insert -- WO2017/223079 --, therefor.

In the Specification

2. In Column 3, Line 63, delete "d)$_x$ (t)" and insert -- $d_x(t)$ --, therefor.

3. In Column 4, Line 7, delete "d1(t)" and insert -- $d_1(t)$ --, therefor.

4. In Column 4, Line 25, delete "V$^{ph}$; T" and insert -- $V_{ph}$; T --, therefor.

5. In Column 4, Line 40, delete "$S_{LSC}(\omega,\tau)=\int_0^{2\pi/\omega} \cos(\omega t)_{cos} [\omega(t-\tau)]dt$" and insert -- $S_{LSC}(\omega,\tau)=\int_0^{2\pi/\omega} \cos(\omega t)\cos[\omega(t-\tau)]dt$ --, therefor.

6. In Column 5, Line 24, delete "S$^{NLSC}$" and insert -- $S_{NLSC}$ --, therefor.

7. In Column 5, Line 26, delete "S$^{NLSC}$" and insert -- $S_{NLSC}$ --, therefor.

8. In Column 9, Line 24, delete "([0.14 0.02] Hz)." and insert -- {[0.14 to 0.025] Hz}. --, therefor.

In the Claims

9. In Column 11, Line 49, in Claim 1, delete "d$_1$(t;ω)" and insert -- $\bar{d_1}(t;\omega)$ --, therefor.

Signed and Sealed this
Second Day of August, 2022

Katherine Kelly Vidal
*Director of the United States Patent and Trademark Office*

CERTIFICATE OF CORRECTION (continued)
U.S. Pat. No. 11,209,566 B2

10. In Column 12, Lines 1-4, in Claim 1 delete " $\sigma_x^{-1} \overline{d}_x\left(I + \frac{x}{V_{ph}}; \omega\right)$ " and insert -- $\sigma_x^{-1} \overline{d}_x\left(I + \frac{x}{V_{ph}}; \omega\right)$ --, therefor.

11. In Column 12, Line 5, in Claim 1, delete "V$_p$h" and insert -- $V_{ph}$ --, therefor.

12. In Column 12, Line 10, in Claim 1, delete "S$_\pi$," and insert -- $S_\pi$ --, therefor.

13. In Column 12, Line 14, in Claim 1, delete " $S_\pi = I_0(b)e^{-b}$ " and insert -- $S_\pi = I_0(b)e^{-b}$, --, therefor.

14. In Column 12, Line 15, in Claim 1, delete "σ" and insert -- $I_0$ --, therefor.

15. In Column 12, Line 23, in Claim 1, delete "and" and insert the same at line 22, after " $b = \frac{\pi^2}{\sigma^2 \omega^2 T}$; " as a continuation paragraph, therefor.